US011990693B2

(12) United States Patent
Miura

(10) Patent No.: US 11,990,693 B2
(45) Date of Patent: May 21, 2024

(54) WIRELESS COMMUNICATION DEVICE AND ANTENNA CONFIGURATION METHOD

(71) Applicant: NEC Platforms, Ltd., Kawasaki (JP)

(72) Inventor: Ken Miura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 329 days.

(21) Appl. No.: 17/423,780

(22) PCT Filed: Nov. 26, 2019

(86) PCT No.: PCT/JP2019/046174
§ 371 (c)(1),
(2) Date: Jul. 16, 2021

(87) PCT Pub. No.: WO2020/158133
PCT Pub. Date: Aug. 6, 2020

(65) Prior Publication Data
US 2022/0123475 A1 Apr. 21, 2022

(30) Foreign Application Priority Data
Feb. 1, 2019 (JP) ................................ 2019-017076

(51) Int. Cl.
*H01Q 9/42* (2006.01)
*H01Q 1/24* (2006.01)
(Continued)

(52) U.S. Cl.
CPC ............... *H01Q 9/42* (2013.01); *H01Q 1/241* (2013.01); *H01Q 19/02* (2013.01); *H01Q 21/28* (2013.01)

(58) Field of Classification Search
CPC ........ H01Q 1/241; H01Q 19/02; H01Q 21/28; H01Q 5/378-392; H01Q 3/01; H01Q 1/243; H01Q 5/45
See application file for complete search history.

(56) References Cited

U.S. PATENT DOCUMENTS 7,215,289 B2 * 5/2007 Harano .................... H01Q 1/24
343/702
2004/0021608 A1 2/2004 Kojima et al.
(Continued)

FOREIGN PATENT DOCUMENTS

CN 1509505 A 6/2004
CN 1716688 A 1/2006
(Continued)

OTHER PUBLICATIONS

Chinese Office Action for CN Application No. 201980090801.2 dated Feb. 11, 2023 with English Translation.
(Continued)

*Primary Examiner* — Dimary S Lopez Cruz
*Assistant Examiner* — Aladdin Abdulbaki

(57) ABSTRACT

In an antenna configuration in which two omnidirectional antenna elements that are arranged on a printed board, a device GND plane connected to a ground potential is formed on the printed board so as to cover an area other than a part where an electronic circuit is formed on the printed board, and parasitic antenna elements that are a first parasitic antenna element and a second parasitic antenna element are arranged at positions adjacent to the respective two omnidirectional antenna elements, in a state of being parallel to the omnidirectional antenna elements, and the parasitic antenna elements are arranged in a state of being close to the device GND plane, and entire lengths of the parasitic antenna elements are each set to be a length that is (½) of a wavelength of radio waves handled by the omnidirectional antenna element.

8 Claims, 15 Drawing Sheets

(51) Int. Cl.
*H01Q 19/02* (2006.01)
*H01Q 21/28* (2006.01)

(56) References Cited

U.S. PATENT DOCUMENTS

| | | | | |
|---|---|---|---|---|
| 2005/0275596 | A1 | 12/2005 | Harano | |
| 2009/0179801 | A1 | 7/2009 | Tsai et al. | |
| 2011/0248895 | A1 | 10/2011 | Bungo et al. | |
| 2013/0099980 | A1 | 4/2013 | Hayashi | |
| 2013/0257661 | A1* | 10/2013 | Yuasa | H01Q 5/378 343/702 |
| 2017/0194701 | A1* | 7/2017 | Ng | H01Q 21/28 |
| 2018/0233807 | A1* | 8/2018 | Ma | H01Q 1/243 |
| 2022/0407217 | A1* | 12/2022 | Wang | H01Q 5/357 |

FOREIGN PATENT DOCUMENTS

| | | | |
|---|---|---|---|
| CN | 1716692 | A | 1/2006 |
| CN | 101330169 | A | 12/2008 |
| CN | 202513278 | U | 10/2012 |
| CN | 102983399 | A | 3/2013 |
| EP | 2975691 | A1 | 1/2016 |
| JP | 2003-110329 | A | 4/2003 |
| JP | 2009-246568 | A | 10/2009 |
| JP | 2012-005146 | A | 1/2012 |
| WO | 2018/038079 | A1 | 3/2018 |

OTHER PUBLICATIONS

International Search Report for PCT Application No. PCT/JP2019/046174, dated Feb. 10, 2020.

CN Office Action for CN Application No. 201980090801.2, dated Jun. 21, 2023 with English Translation.

Wu Jian et al., A Dual-band Inverted-F Antenna (IFA) with Parasite Branch, Science Technology and Engineering, vol. 6, No. 18, Sep. 30, 2006, pp. 2838-2740.

Han Yu-nan et al., Multiband Microstrip Antenna Design Using Parasitic Coupling Elements, Journal of Beijing University of Posts and Telecommunications, vol. 41, No. 4, Aug. 15, 2018, pp. 24-28.

David Garrido Lopez et al., Low-Profile Tri-band Inverted-F Antenna for Vehicular Applications in HF and VHF Bands, IEEE Transactions on Antennas and Propagation, vol. 63, No. 11, Aug. 27, 2015, pp. 4632-4639.

* cited by examiner

WIRELESS COMMUNICATION DEVICE AND ANTENNA CONFIGURATION METHOD

This application is a National Stage Entry of PCT/JP2019/046174 filed on Nov. 26, 2019, which claims priority from Japanese Patent Application 2019-017076 filed on Feb. 1, 2019, the contents of all of which are incorporated herein by reference, in their entirety.

TECHNICAL FIELD

The present invention relates to a wireless communication device and an antenna configuration method, and particularly to a wireless communication device and an antenna configuration method that are capable of easily adjusting the directivity of an antenna in the arrival direction of target radio waves.

BACKGROUND ART

In recent years, with increase in rate of wireless communication, wireless communication devices having more favorable wireless communication characteristics have been demanded. As for such wireless communication devices, for example, the demand for home routers that conform to the WiMAX (Worldwide Interoperability for Microwave Access) standard or LTE (Long Term Evolution) standard has been increasing.

In order to achieve comfortable wireless communication using an omnidirectional antenna in a home router conforming to such a standard, it is required to install the home router at a place with a high radio field intensity as much as possible. In particular, the communication frequency band in the WiMAX standard is in a gigahertz band, which has high frequencies, and has a high propagation loss. Consequently, in a case where a home router conforming to the WiMAX standard is installed at the center or the like of a room at which radio waves are difficult to arrive, comfortable wireless communication cannot sometimes be achieved.

To prevent such situations, a state-of-the-art technology takes measures such that the home router is installed near a window through which radio waves are easily emitted, or a reflection board for adjusting the directivity of the antenna in a direction where radio waves should arrive is attached, as described in Japanese Unexamined Patent Application Publication No. 2012-5146, "Polarization shared antenna," which is Patent Literature 1.

CITATION LIST

Patent Literature

Patent Literature 1
Japanese Unexamined Patent Application Publication No. 2012-5146

SUMMARY OF INVENTION

Unfortunately, existing wireless communication devices with antennas being configured to include omnidirectional antenna elements, such as inverted-L antenna elements, have a limitation on improvement in radio wave emission characteristics. For example, possible measures for the home routers described above as an example of existing wireless communication devices cause the following problems.

For example, even if a home router is installed near a window having a large opening, the case with the directivity of the antenna that is not adjusted to the outside of the window does not exert large advantageous effects, and cannot achieve comfortable wireless communication.

The state-of-the-art technology described in Patent Literature 1 and the like that install the reflection board so as to provide the directivity for radio waves requires the reflection board larger in size than the home router.

Furthermore, use of the reflection board as described in the aforementioned Patent Literature causes a disadvantage that radio waves emitted from a wireless LAN antenna element that performs communication between the home router and a subordinate wireless communication terminal (wireless LAN (Local Area Network) terminal) also have the same directivity as the antenna element that emits radio waves in the WiMAX standard or LTE standard.

That is, for example, in a case where a home router conforming to the WiMAX standard is installed near a window, an antenna for WiMAX is required to have the directivity of radio waves toward the outside of the window. Inversely, a wireless LAN antenna for wireless communication with a subordinate wireless communication terminal is required to provide the directivity of radio waves toward the room in which the subordinate wireless communication terminal resides, that is, the inside of the window. Consequently, even use of the reflection board as described in the aforementioned Patent Literature 1 and the like cannot support the intended directivity.

(Object of this Development)

In view of such situations, this development has an object to provide a wireless communication device that has an antenna configuration capable of easily providing the directivity of an antenna element in a desired direction, and an antenna configuration method.

To solve the problem described above, the wireless communication device and the antenna configuration method according to the present invention mainly adopt the following characteristic configuration.

(1) A wireless communication device according to the present invention is a wireless communication device having an antenna configuration in which an omnidirectional antenna element connected to a feeding point is arranged on a printed board, wherein a ground plane connected to a ground potential is formed on the printed board so as to cover an area other than a part where an electronic circuit is formed on the printed board, a parasitic antenna element is arranged at a position adjacent to the omnidirectional antenna element, in a state of being parallel to the omnidirectional antenna element, and the parasitic antenna element is arranged in a state of being close to the ground plane, and an entire length of the parasitic antenna element is set to be a length that is (½) of a wavelength of radio waves handled by the omnidirectional antenna element.

(2) An antenna configuration method according to the present invention is an antenna configuration method for a wireless communication device having an antenna configuration in which an omnidirectional antenna element connected to a feeding point is arranged on a printed board, wherein a ground plane connected to a ground potential is formed on the printed board so as to cover an area other than a part where an electronic circuit is formed on the printed board, a parasitic antenna element is arranged at a position adjacent to the omnidirectional antenna element, in a state of being parallel to the omnidirectional antenna element, and the parasitic antenna element is arranged in a state of being close to the ground plane, and an entire length of the parasitic antenna element is set to be a length that is (½) of a wavelength of radio waves handled by the omnidirectional antenna element.

The wireless communication device and the antenna configuration method according to the present invention can mainly exert the following advantageous effects.

The present invention has the configuration where the parasitic antenna element having a length that is (½) of the desired radio wave wavelength is arranged adjacent to the omnidirectional antenna element, and the ground plane (device GND plane) connected to the ground (GND) potential of the wireless communication device can be used as a reflection board for radio waves emitted by the parasitic antenna element. Consequently, a directional antenna capable of emitting strong radio waves in a desired specific direction can be inexpensively achieved. When the wireless communication device according to the present invention is installed, the directivity of the antenna is aligned in the direction of the desired radio waves, which can achieve a comfortable wireless communication environment.

DESCRIPTION OF EMBODIMENTS

Preferable example embodiments of a wireless communication device and an antenna configuration method according to the present invention are hereinafter described with reference to the accompanying drawings. Note that drawing reference signs assigned to the following diagrams are assigned to respective elements as an example for facilitating understanding for the sake of convenience. It is a matter of course that there is no intention to limit the present invention to the illustrated aspects.

Characteristics of Present Invention

Before description of the example embodiments of the present invention, the overview of characteristics of the present invention is first described. The present invention is characterized in that a parasitic antenna element is arranged adjacent to an omnidirectional inverted-L antenna element or inverted-F antenna element, and a device GND plane (ground plane) connected to a ground (GND) potential of the wireless communication device is utilized as a reflection board for radio waves emitted by the parasitic antenna element, thereby achieving an operation of an antenna having a directivity.

The directional antenna can be easily and inexpensively achieved, thereby easily allowing the antenna of the wireless communication device to be adjusted in the arrival direction of desired radio waves. Accordingly, the wireless communication characteristics can be improved.

Furthermore, the present invention is also characterized in that the shape of the parasitic antenna element has a bent shape of being bent at a right angle in a vertical or horizontal direction. As a result, both of horizontally polarized and vertically polarized radio waves are easily allowed to be transmitted and received, which can further improve the wireless communication characteristics.

That is, the parasitic antenna element is arranged adjacent to the inverted-L antenna element or the inverted-F antenna element, which is an example of the omnidirectional antenna element. Furthermore, The parasitic antenna element is formed to have a bent shape of being bent at a right angle in the vertical and horizontal direction such that the ground plane (i.e., an earth plane connected to the ground potential of the device) formed on the printed board where the parasitic antenna element is formed can be effectively utilized as a reflection board for radio waves emitted by the parasitic antenna to provide directivity for both of the vertically polarized waves and horizontally polarized waves of the radio waves. Accordingly, the directional antenna having excellent wireless communication characteristics can be configured inexpensively.

Configuration Example of Example Embodiment of Present Invention

Figure 1A:
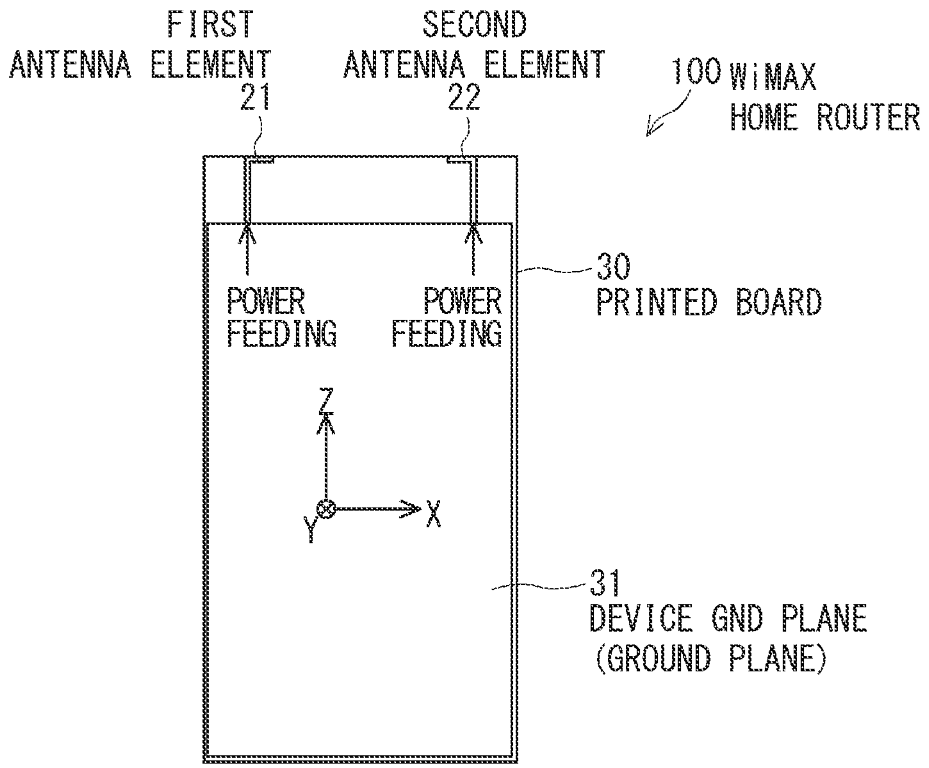
FIG. 1A schematically shows a configuration example where two omnidirectional antenna elements (inverted-L antenna elements) are arranged on a printed board implemented in a WiMAX home router, which is an example of a wireless communication device according to the present invention.
Figure 1B:
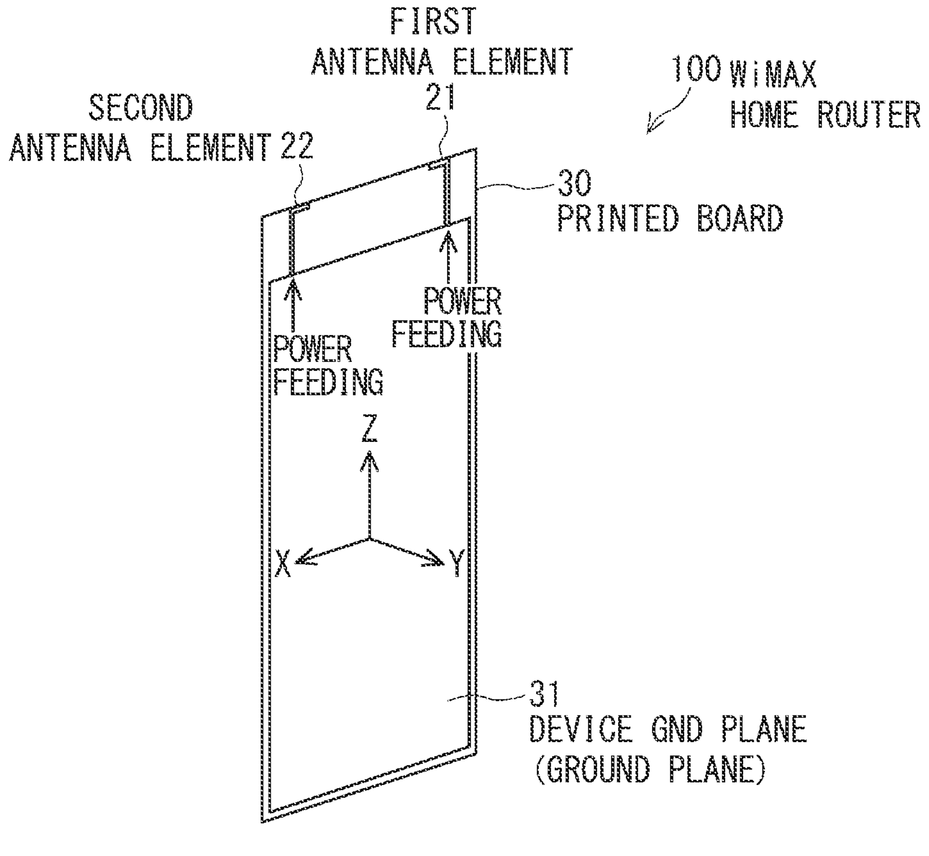
FIG. 1B schematically shows the configuration example where the two omnidirectional antenna elements (inverted-L antenna elements) are arranged on the printed board implemented in the WiMAX home router that is the example of the wireless communication device according to the present invention.

Next, as for the example embodiment of the wireless communication device according to the present invention, a WiMAX home router is exemplified, and the configuration example thereof is specifically described. FIGS. 1A and 1B schematically show a configuration example where two omnidirectional antenna elements (inverted-L antenna elements) are arranged on a printed board implemented in a WiMAX home router, which is an example of the wireless communication device according to the present invention, and show a state before the parasitic antenna, which is an essential configuration element in the present invention, is implemented. FIG. 1A schematically shows a front view of a printed board in the WiMAX home router. FIG. 1B schematically shows a perspective rear view of the printed board in the WiMAX home router.

As shown in FIGS. 1A and 1B, on the printed board 30 in the WiMAX home router 100 there are arranged two omnidirectional antennas, which are a first antenna element 21 and a second antenna element 22, extending in the Z-axis direction respectively from feeding points, for example, as inverted-L antenna elements, so as to be arranged adjacent to an edge on the printed board 30 in the X-axis direction (the lateral direction in FIG. 1A). The two omnidirectional antenna elements, which are the first antenna element 21 and the second antenna element 22, are formed to be bent into L-shapes in directions opposite to each other, as inverted-L antenna elements, adjacent to the edge (for example, the upper edge in FIG. 1A) of the printed board 30 in the Z-axis direction. The first antenna element 21 and the second antenna element 22, and the area of the printed board 30 other than a part where the electronic circuit including the feeding points is formed are covered with a device GND plane (ground plane) 31 connected to the GND (Ground) potential (ground potential) of the WiMAX home router 100 where the printed board 30 is implemented.

Note that this example embodiment assumes the WiMAX home router 100 assumes 2×2 MIMO (Multiple-Input & Multiple-Output) and includes two omnidirectional antennas, which are the first antenna element 21 and the second antenna element 22, and also assumes a case of handling radio waves in a frequency band of 2.6 GHz band as communication frequencies for WiMAX.

Figure 2A:
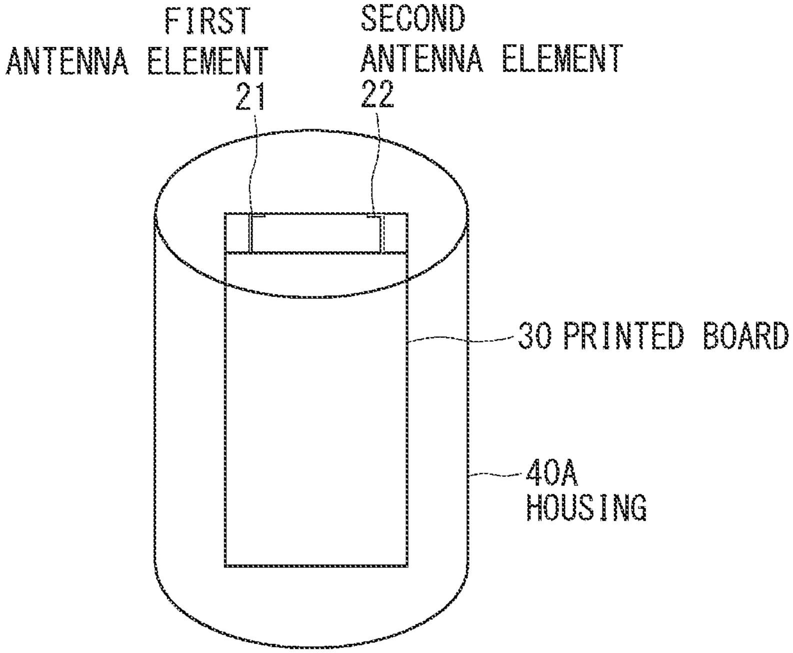
FIG. 2A schematically shows an example of an implementation state of a housing in which the printed board is implemented in the WiMAX home router shown in FIGS. 1A and 1B.
Figure 2B:
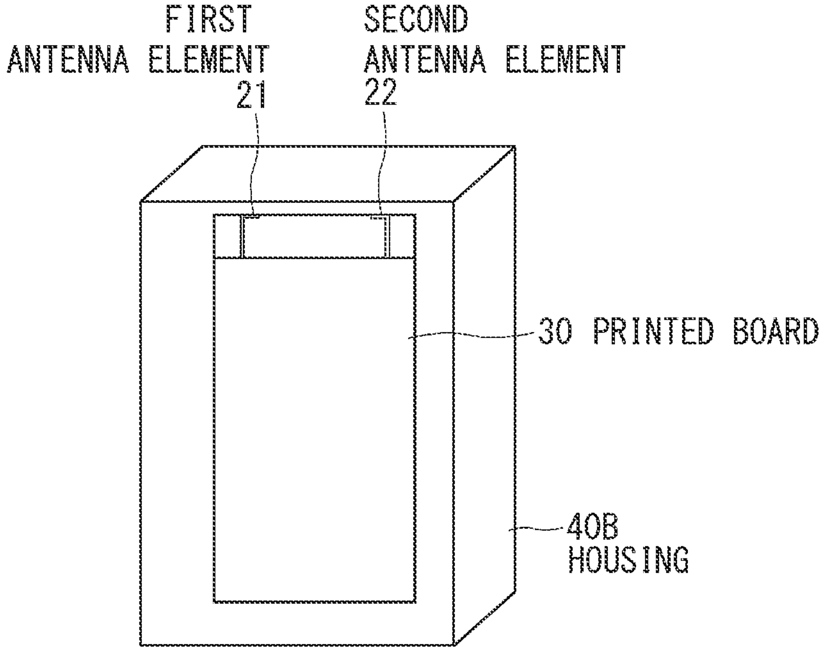
FIG. 2B schematically shows an example of an implementation state of a housing in which the printed board is implemented in the WiMAX home router shown in FIGS. 1A and 1B.

FIGS. 2A and 2B schematically show an example of an implementation state of a housing in which the printed board 30 is implemented in the WiMAX home router 100 shown in FIGS. 1A and 1B. FIG. 2A shows a case where a housing 40A including the printed board 30 implemented therein is a cylindrical-shaped housing. FIG. 2B shows a case where a housing 40B including the printed board 30 implemented therein has a rectangular-parallelepiped-shaped housing.

Figure 3A:
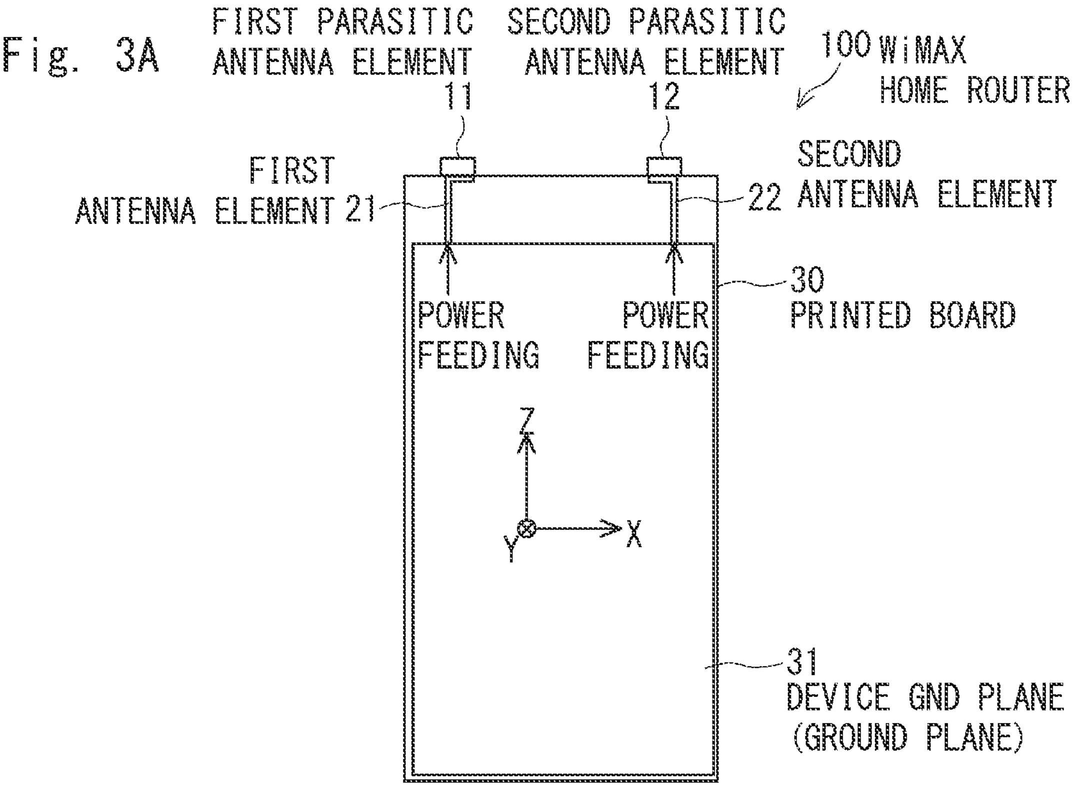
FIG. 3A schematically shows an example of an antenna configuration of the WiMAX home router, which is an example of the wireless communication device according to the present invention.
Figure 3B:
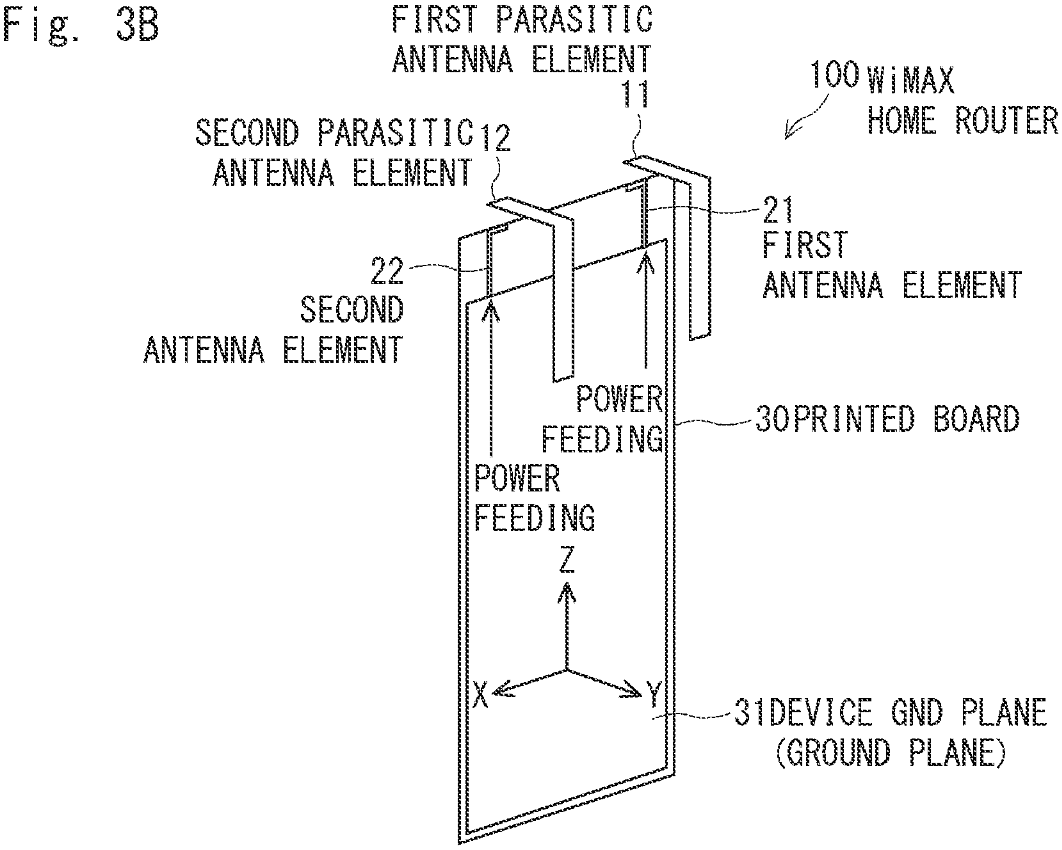
FIG. 3B schematically shows an example of the antenna configuration of the WiMAX home router, which is an example of the wireless communication device according to the present invention.

FIGS. 3A and 3B schematically show an example of an antenna configuration of the WiMAX home router 100, which is an example of the wireless communication device according to the present invention, and show a configuration example where a parasitic antenna element is added adjacent to each of the two omnidirectional antenna elements (the first antenna element 21 and the second antenna element 22) implemented on the printed board 30 in the WiMAX home router 100 shown in FIGS. 1A and 1B. Similar to FIG. 1A, FIG. 3A schematically shows a front view of the printed board 30 in the WiMAX home router 100. Similar to FIG. 1B, FIG. 3B schematically shows a perspective rear view of the printed board 30 in the WiMAX home router 100.

As shown in FIG. 3B, two parasitic antenna elements, which are a first parasitic antenna element 11 and a second parasitic antenna element 12, are each arranged in a state of being close to the device GND plane 31 on a back surface of the printed board 30. Between the two parasitic antenna elements, the first parasitic antenna element 11 is arranged adjacent to the first antenna element 21, and has a shape of extending in the Z-axis direction in a state of being parallel to the first antenna element 21, and of being bent at a right angle in the −Y-axis direction (i.e., toward the surface of the printed board 30) so as to be close to the printed board 30 at a position where the first parasitic antenna element 11 reaches the edge (upper edge) of the printed board 30. Likewise, the second parasitic antenna element 12 is arranged adjacent to the second antenna element 22, and has a shape of extending in the Z-axis direction in a state of being parallel to the second antenna element 22, and of being bent at a right angle in the −Y-axis direction (i.e., toward the surface of the printed board 30) so as to be close to the printed board 30 at a position where the second parasitic antenna element 12 reaches the edge (upper edge) of the printed board 30.

Note that as for the directivity of the antenna of the WiMAX home router 100, a directivity adjusted in the Y-axis direction (i.e., the direction perpendicular to the back surface of the printed board 30) in FIGS. 3A and 3B is assumed to be provided. The first parasitic antenna element 11 and the second parasitic antenna element 12 are each made of a metal conductor, are arranged in parallel to the first antenna element 21 and the second antenna element 22, and are configured such that the entire lengths of the first parasitic antenna element 11 and the second parasitic antenna element 12 each including the right-angle bent part in the middle (that is, at the position where the first parasitic antenna element 11 and the second parasitic antenna element 12 reach the edge (upper edge) of the printed board 30) are each set to a length that is (½) of the communication wavelength λ of radio waves of the desired frequency of 2.6 GHz, that is, (λ/2), in order to resonate the omnidirectional antenna elements, which are the first antenna element 21 and the second antenna element 22, in a frequency band of 2.6 GHz band.

The positional relationships of the first parasitic antenna element 11 and the second parasitic antenna element 12 respectively with the first antenna element 21 and the second antenna element 22, and the widths of the first parasitic antenna element 11 and the second parasitic antenna element 12, and the positions of being bent at a right angle in the middle, are adjusted in conformity with the directivity of the antenna of the WiMAX home router 100.

As described above, the first parasitic antenna element 11 and the second parasitic antenna element 12 are bent at a right angle in the −Y-axis direction (toward the surface of the printed board 30) at the edge (upper edge) of the printed board 30 to have a shape that does not extend to the position apart from the printed board 30, in order to allow the device GND plane 31 of the printed board 30 to be effectively utilized as the reflection board for radio waves. That is, if the distal end portions of the first parasitic antenna element 11 and the second parasitic antenna element 12 extend to the position apart from the printed board 30, the target directivity in the Y-axis direction (i.e., the perpendicular direction from the back surface of the printed board 30) cannot be obtained.

Furthermore, in order to obtain the target directivity in the Y-axis direction, the positions at which the first parasitic antenna element 11 and the second parasitic antenna element 12 are bent in the middle at a right angle in the −Y-axis direction are required to be configured such that at least a length longer than half the entire length, i.e., (λ/2)×(½)=(λ/4), are on the back surface side of the printed board 30 (that is, arranged in the state of being parallel respectively to the first antenna element 21 and the second antenna element 22, and being on the antenna element part side toward the Z-axis direction).

In other words, the two parasitic antenna elements arranged adjacent to the device GND plane (ground plane) 31 have the bent shapes of being bent at a right angle in the direction of approaching the printed board 30 at the position where the parasitic antenna elements reach the edge (upper edge) of the printed board 30. The bent positions are required to be configured as follows. That is, the center positions of the two parasitic antenna elements in the length direction are required to be at the antenna element parts up to the edge (upper edge) of the printed board 30 (the antenna element parts extending in the Z-axis direction), and to be close to the device GND plane (ground plane).

This is because antenna currents have the maximum values at the center portions of the first parasitic antenna element 11 and the second parasitic antenna element 12 in the length direction, and the currents having the maximum values are allowed to be utilized to reflect radio waves to further improve the directivity of radio waves accordingly. That is, this is because if the first parasitic antenna element 11 and the second parasitic antenna element 12 are bent at a right angle in the −Y-axis direction in the middle in the length direction and a length of the antenna element part is shorter than half the entire length of the antenna element part residing on the back surface of the printed board 30, i.e., (λ/4), the emission characteristics of radio waves from the first parasitic antenna element 11 and the second parasitic antenna element 12 in the Y-axis direction are degraded, and the directivity cannot be obtained.

Note that as for the omnidirectional inverted-L antenna elements, which are the first antenna element 21 and the second antenna element 22, exemplified in FIGS. 1A, 1B, 3A and 3B, the case of being drawn on the printed board 30 is shown. However, there is no limitation to such a case. For example, the elements may be formed using chip antennas. The omnidirectional antenna elements are not necessarily inverted-L antenna elements, and may be inverted-F antenna elements instead.

Description of Operation Example of Example Embodiment of Present Invention

Figure 4A:
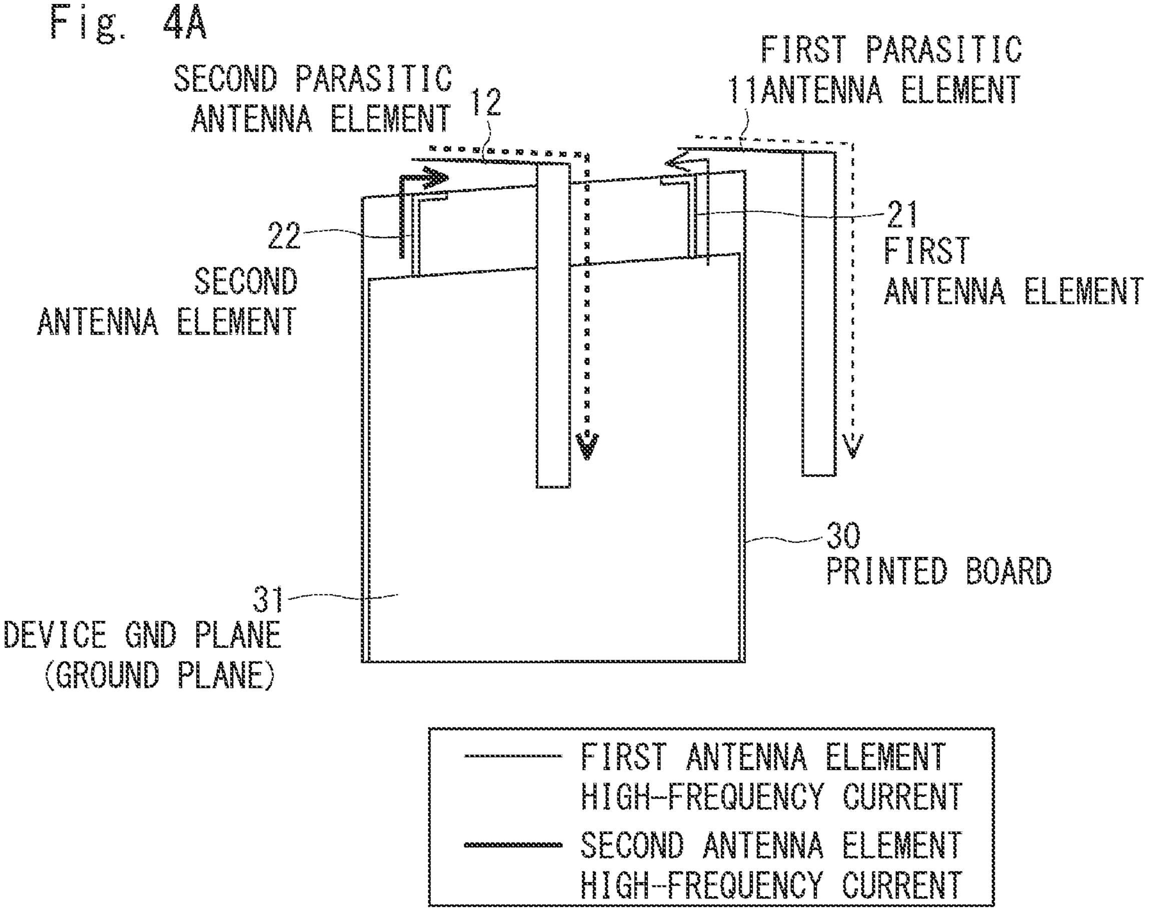
FIG. 4A schematically illustrates an example of an antenna operation in the WiMAX home router shown in FIGS. 3A and 3B as an example of the wireless communication device according to the present invention.
Figure 4B:
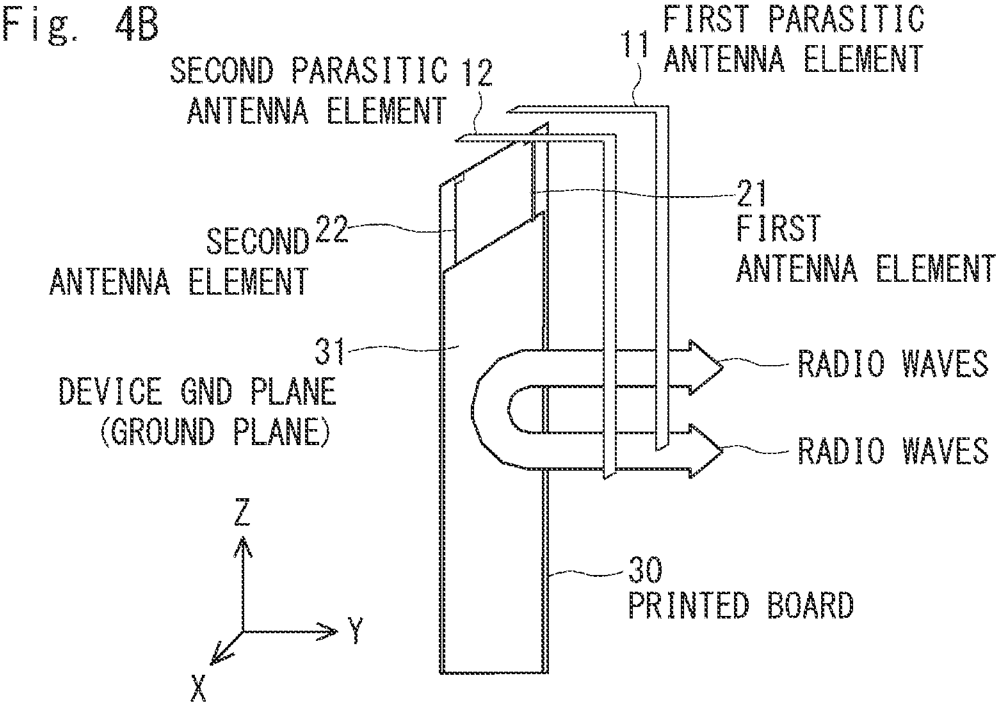
FIG. 4B schematically illustrates an example of an antenna operation in the WiMAX home router shown in FIGS. 3A and 3B as an example of the wireless communication device according to the present invention.

Next, the operation of the WiMAX home router 100 shown in FIGS. 3A and 3B as the example of the wireless communication device according to the present invention is described in detail. FIGS. 4A and 4B schematically illustrate an example of the antenna operation in the WiMAX home router 100 shown in FIGS. 3A and 3B as the example of the wireless communication device according to the present invention. Unlike FIG. 3A, FIG. 4A schematically shows a case where the printed board 30 is viewed from the back surface in the WiMAX home router 100, and show situations of the first parasitic antenna element 11 and the second parasitic antenna element 12 in a case where high-frequency currents flow from the feeding points to the omnidirectional inverted-L antenna elements, which are the first antenna element 21 and the second antenna element 22. Similar to FIG. 3B, FIG. 4B schematically shows the case where the printed board 30 in the WiMAX home router 100 is viewed from behind in a perspective manner, and show the situations of radio waves emitted from the first parasitic antenna element 11 and the second parasitic antenna element 12.

When high-frequency currents of a frequency of 2.6 GHz respectively flow into the first antenna element 21 and the second antenna element 22 as indicated by solid arrows in FIG. 4A, high-frequency currents of an excited frequency of 2.6 GHz flow also into the first parasitic antenna element 11 and the second parasitic antenna element 12 arranged in parallel respectively adjacent to the first antenna element 21 and the second antenna element 22 as indicated by broken arrows in FIG. 4A.

That is, the first parasitic antenna element 11 and the second parasitic antenna element 12 each have a length that is (½) of the communication wavelength λ of the frequency of 2.6 GHz, and are arranged in parallel in the Z-axis direction adjacent respectively to the first antenna element 21 and the second antenna element 22. Accordingly, when high-frequency currents of frequency of 2.6 GHz flows respectively into the first antenna element 21 and the second antenna element 22, excitation occurs to allow high-frequency currents of the same frequency of 2.6 GHz to flow respectively into the first parasitic antenna element 11 and the second parasitic antenna element 12.

When the high-frequency currents of the frequency of 2.6 GHz flows respectively into the first parasitic antenna element 11 and the second parasitic antenna element 12, radio waves are emitted on a plane perpendicular to the Z-axis direction. Here, most of the area of the back surface of the printed board 30 at positions respectively close to the first parasitic antenna element 11 and the second parasitic antenna element 12 is covered with the device GND plane 31. Accordingly, as indicated by thick arrows in FIG. 4B, radio waves emitted in the −Y-axis direction are reflected by the device GND plane 31 of the printed board 30 and are emitted in the Y-axis direction. Consequently, stronger radio waves are emitted in the Y-axis direction to thus form radio waves having the directivity in the Y-axis direction.

Note that as shown in FIGS. 3A and 3B, the first parasitic antenna element 11 and the second parasitic antenna element 12 are formed to have the shapes bent at a right angle in the middle in the −Y-axis direction (toward the surface of the printed board 30 from the back surface). Accordingly, vertically polarized waves on the XY plane occur.

Figure 5:
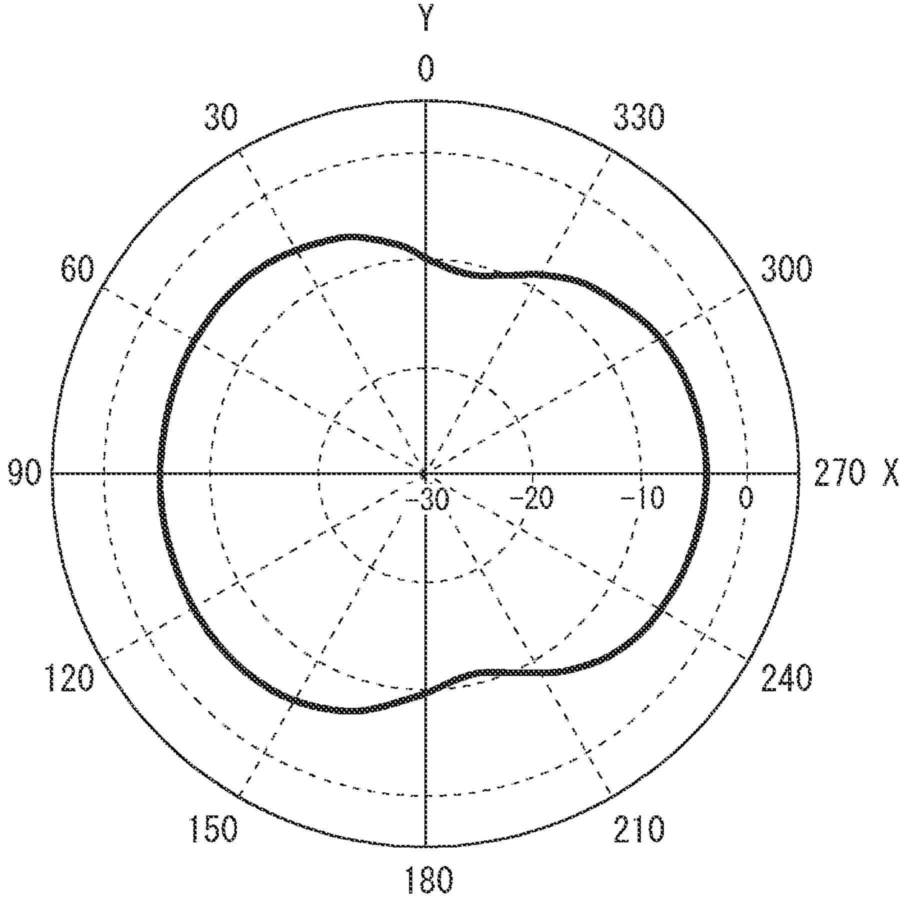
FIG. 5 is a characteristic diagram showing a measurement result of an emission pattern of vertically polarized waves on an XY plane in a case of power feeding to a first antenna element 21 in the antenna configuration shown in FIGS. 1A and 1B.
Figure 6:
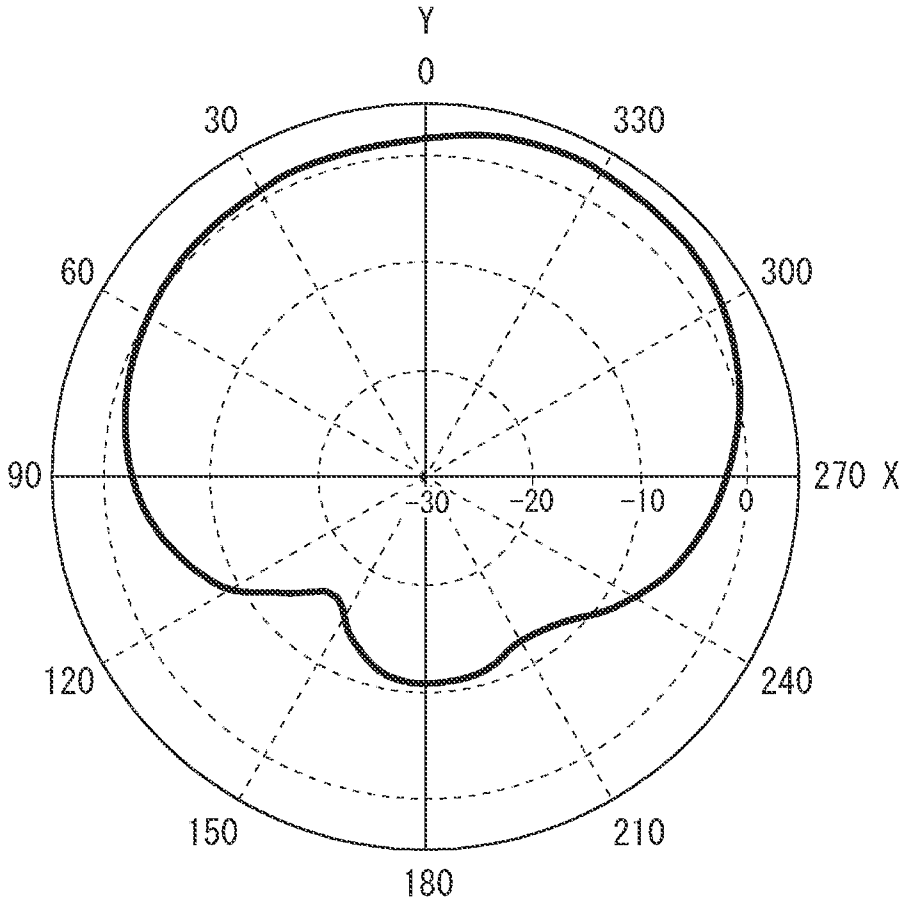
FIG. 6 is a characteristic diagram showing a measurement result of an emission pattern of vertically polarized waves on the XY plane in a case of power feeding to a first antenna element 21 in the antenna configuration shown in FIGS. 3A and 3B.

As for the emission pattern of vertically polarized waves on the XY plane, FIGS. 5 and 6 respectively show measurement results of the case of the antenna configuration in FIGS. 1A and 1B where the first parasitic antenna element 11 and the second parasitic antenna element 12 are not arranged (that is, the antenna configuration of consisting only of the omnidirectional inverted-L antenna elements, which are the first antenna element 21 and the second antenna element 22), and the case of the antenna configuration in FIGS. 3A and 3B where the first parasitic antenna element 11 and the second parasitic antenna element 12 are arranged. FIG. 5 is a characteristic diagram showing a measurement result of the emission pattern of vertically polarized waves on the XY plane in a case of power feeding to the first antenna element 21 in the antenna configuration shown in FIGS. 1A and 1B. FIG. 6 is a characteristic diagram showing a measurement result of the emission pattern of vertically polarized waves on the XY plane in a case of power feeding to the first antenna element 21 in the antenna configuration shown in FIGS. 3A and 3B. The characteristic diagram showing the measurement result of the emission pattern of vertically polarized waves on the XY plane in the case of power feeding to the second antenna element 22 in the antenna configuration shown in FIGS. 1A and 1B is substantially identical or similar to the characteristic diagram in FIG. 5. Accordingly, illustration thereof is omitted. The characteristic diagram showing the measurement result of the emission pattern of vertically polarized waves on the XY plane in the case of power feeding to the second antenna element 22 in the antenna configuration shown in FIGS. 3A and 3B is substantially identical or similar to the characteristic diagram in FIG. 6. Accordingly, illustration thereof is omitted.

According to the measurement result of the emission pattern shown in FIG. 5, the vertically polarized radio waves are emitted substantially uniformly in all the directions on the XY plane. Consequently, it can be confirmed that the antenna configuration shown in FIGS. 1A and 1B only includes the omnidirectional inverted-L antenna elements, and is not any antenna configuration having a directivity in a specific direction. On the other hand, as shown in the measurement result of the emission pattern in FIG. 6, it can be confirmed that the antenna configuration in FIGS. 3A and 3B where the first parasitic antenna element 11 and the second parasitic antenna element 12 are arranged is an antenna configuration having a strong directivity in the Y-axis direction in the vertical direction from the back surface of the printed board 30 due to a reflection effect by the device GND plane 31 of the printed board 30.

Note that in the above description, the WiMAX home router 100 having a 2×2 MIMO configuration has been described as an example of the wireless communication device according to the present invention. However, the wireless communication device according to the present invention is not limited to such a case. For example, the wireless communication device is not necessarily the home router and may be a router device for a business establishment, a vehicle-mounted wireless communication device or a home electronic appliances, or a wireless communication device, such as a router device conforming to the LTE standard, or a wireless communication device that performs wireless communication using a wireless communication standard other than the WiMAX standard or the LTE standard. Instead of the MIMO configuration, a wireless communication device that includes an omnidirectional antenna element and a parasitic antenna element may be adopted. It is a matter of course that even in the case of the MIMO configuration, for example, a 4×4 MIMO configuration may be adopted instead of the 2×2 MIMO configuration.

Description of Advantageous Effects of Example Embodiment

As described above in detail, this example embodiment can obtain the following advantageous effects.

This example embodiment has the configuration in which two parasitic antenna elements, which are one first parasitic antenna element 11 and one second parasitic antenna element 12, having the entire length that is (½) of the desired radio wave wavelength, can be respectively arranged adjacent to the two omnidirectional antenna elements, which are the first antenna element 21 and the second antenna element 22, and the device GND plane (ground plane) 31 connected to the ground (GND) potential of the WiMAX home router 100, which is an example of the wireless communication device according to the present invention can be utilized as the reflection board of radio waves emitted by the parasitic antenna elements. Consequently, a directional antenna capable of emitting strong radio waves in a desired specific direction can be inexpensively achieved. Aligning the directivity of the antenna in the direction of the desired radio waves when the wireless communication device that is, for example, the WiMAX home router 100 or the like is installed can allow for a comfortable wireless communication environment.

Other Example Embodiment of Present Invention

Next, another example embodiment different from the antenna configuration of the WiMAX home router 100 shown in FIGS. 3A and 3B as the example embodiment described above is described.

Other First Example Embodiment of Present Invention

The antenna configuration of the WiMAX home router 100 shown in FIGS. 3A and 3B can achieve the emission characteristics having the directivity in the Y-axis direction with respect to the vertically polarized wave component on the XY plane as shown in the measurement result of the emission pattern on the XY plane in FIG. 6. However, as shown in a characteristic diagram in FIG. 7, there is a possibility that the horizontally polarized wave component on the XY plane cannot achieve sufficient directivity. This is because no high-frequency current on the XY plane, i.e., in the horizontal direction, flows to the antenna element parts arranged along the back surface of the printed board 30 corresponding to the first parasitic antenna element 11 and the second parasitic antenna element 12.

Figure 7:
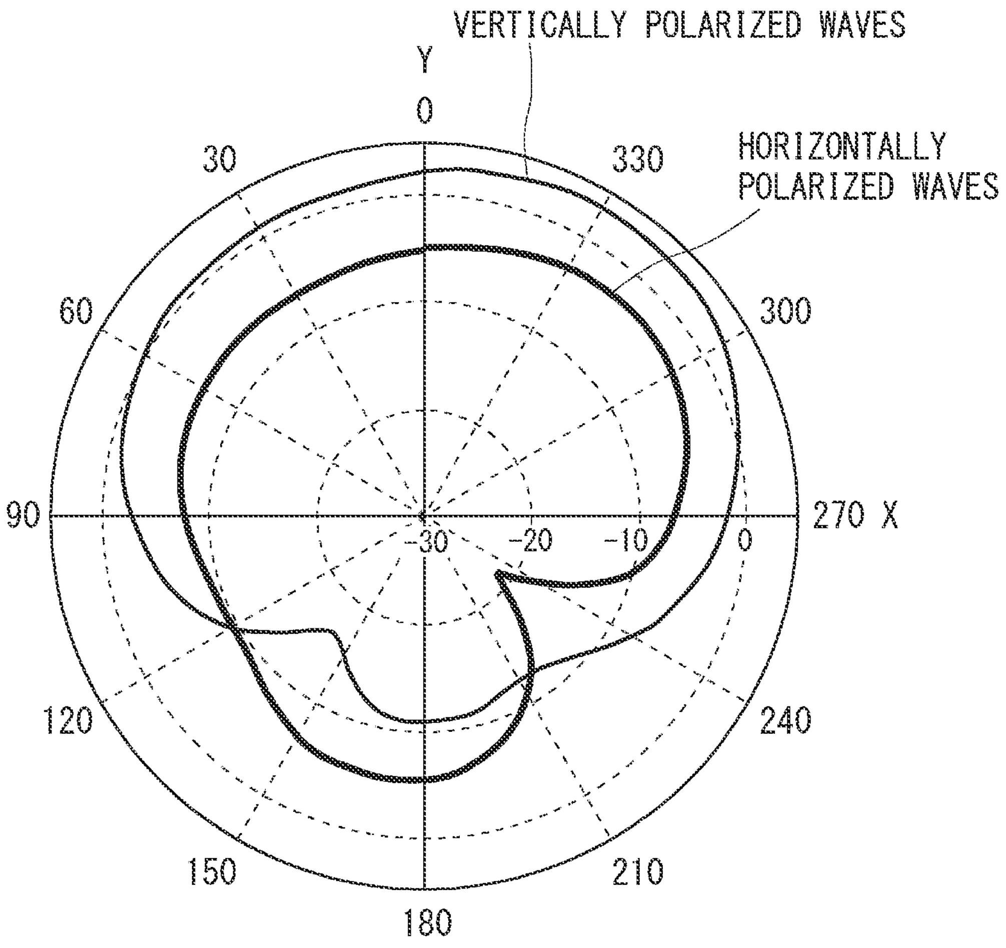
FIG. 7 is a characteristic diagram showing a measurement result of an emission pattern of vertically polarized waves and horizontally polarized waves on the XY plane in the case of power feeding to the first antenna element 21 in the antenna configuration shown in FIGS. 3A and 3B.

FIG. 7 is a characteristic diagram showing a measurement result of an emission pattern of vertically polarized waves and horizontally polarized waves on the XY plane in the case of power feeding to a first antenna element 21 in the antenna configuration shown in FIGS. 3A and 3B. In the characteristic diagram in FIG. 7, a curve indicated by a thin line shows the emission pattern of vertically polarized waves on the XY plane, and a curve indicated by a thick line shows the emission pattern of horizontally polarized waves on the XY plane. As shown in the characteristic diagram in FIG. 7, the emission pattern of horizontally polarized waves on the XY plane has degraded emission characteristics in comparison with the emission pattern of vertically polarized waves, and is in the state where the directivity in the Y-axis direction is not sufficiently achieved. The characteristic diagram showing the measurement result of the emission patterns of vertically polarized waves and horizontally polarized waves on the XY plane in the case of power feeding to the second antenna element 22 in the antenna configuration shown in FIGS. 3A and 3B, is substantially identical or similar to the characteristic diagram in FIG. 7. Accordingly, illustration thereof is omitted.

Figure 8:
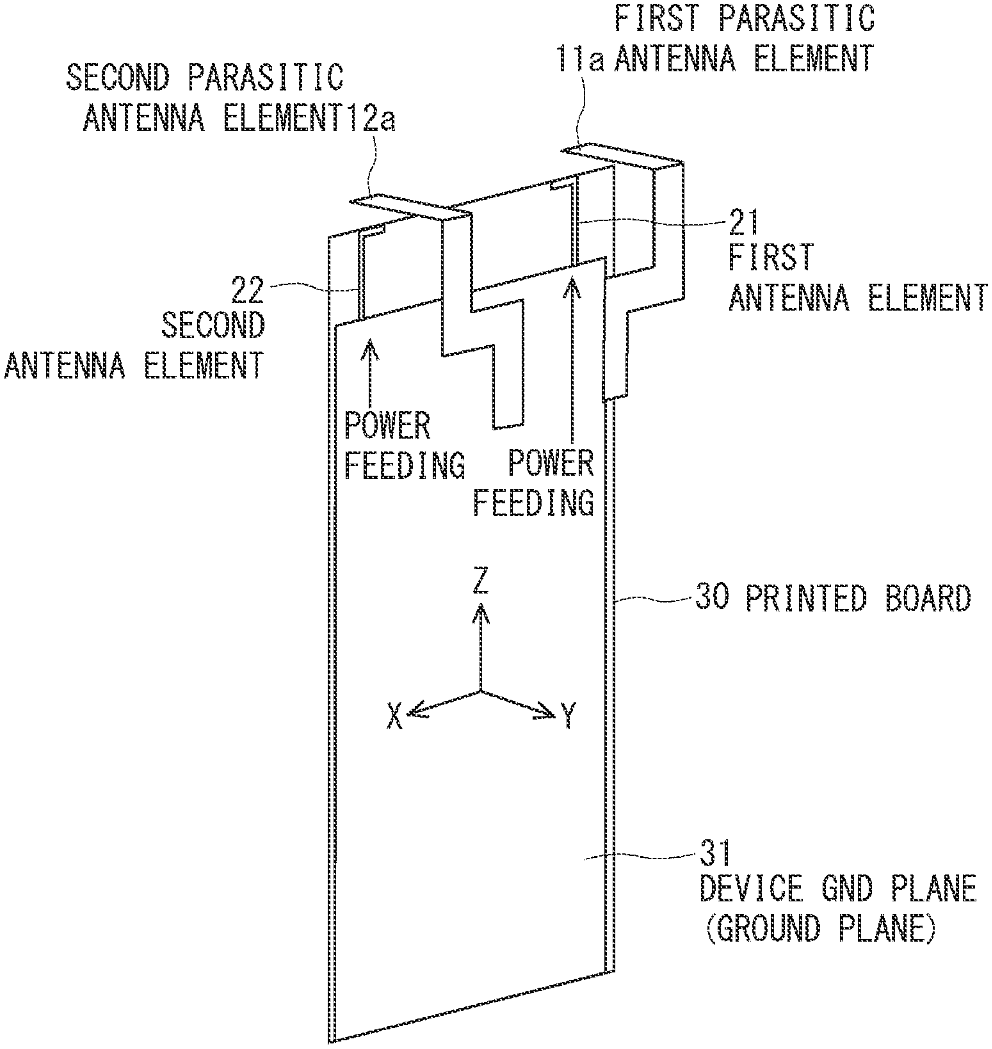
FIG. 8 schematically shows an example of an antenna configuration that is different from that in FIGS. 3A and 3B and is of the WiMAX home router, which is an example of the wireless communication device according to the present invention.

Also for the horizontally polarized wave component on the XY plane, in order to achieve the emission characteristics having a directivity in the Y-axis direction, a high-frequency current on the XY plane, i.e., in the horizontal direction, is required to flow through the antenna element parts arranged along the back surface of the printed board 30 corresponding to the first parasitic antenna element 11 and the second parasitic antenna element 12. Accordingly, it is preferable that the antenna shapes of the first parasitic antenna element 11 and the second parasitic antenna element 12 have shapes as shown in FIG. 8, for example. FIG. 8 schematically shows an example of an antenna configuration of the WiMAX home router 100, which is an example of the wireless communication device according to the present invention, different from that in FIGS. 3A and 3B. Similar to FIG. 3B, FIG. 8 schematically shows a case where the printed board 30 in the WiMAX home router 100 is viewed from behind in a perspective manner. FIG. 8 shows an example where the shapes of two parasitic antenna elements, which are a first parasitic antenna element 11*a* and a second parasitic antenna element 12*a*, are different from those of the two parasitic antenna elements, which are the first parasitic antenna element 11 and the second parasitic antenna element 12, in FIGS. 3A and 3B.

That is, in FIG. 8, first, between the two parasitic antenna elements, which are the first parasitic antenna element 11*a* and the second parasitic antenna element 12*a*, the first parasitic antenna element 11*a* is arranged adjacent to the first antenna element 21, and extends in the Z-axis direction in a state of being in parallel to the first antenna element 21, and is bent at a right angle in the middle before reaching the edge (upper edge) of the printed board 30 and then extends in the −X-axis direction (horizontal direction) that is parallel to the back surface of the printed board 30. Subsequently, the first parasitic antenna element 11*a* is bent again at a right angle so as to extend in the Z-axis direction, and is then bent at a right angle in the −Y-axis direction (i.e., toward the surface of the printed board 30) so as to be close to the printed board 30 at the position where the first parasitic antenna element 11*a* reaches the edge (upper edge) of the printed board 30.

Likewise, the second parasitic antenna element 12*a* is arranged adjacent to the second antenna element 22, and extends in the Z-axis direction in a state of being in parallel to the second antenna element 22, and is bent at a right angle in the middle before reaching the edge (upper edge) of the printed board 30 and then extends in the X-axis direction (horizontal direction) that is parallel to the back surface of the printed board 30. Subsequently, the second parasitic antenna element 12*a* is bent again at a right angle so as to extend in the Z-axis direction, and is then bent at a right angle in the −Y-axis direction (i.e., toward the surface of the printed board 30) so as to be close to the printed board 30 at the position where the second parasitic antenna element 12*a* reaches the edge (upper edge) of the printed board 30.

Note that the antenna shapes of the two omnidirectional antenna elements (inverted-L antenna elements), which are the first antenna element 21 and the second antenna element 22, and the shape of the device GND plane 31 of the printed board 30 are completely identical to those in the case in FIGS. 3A and 3B.

Figure 9:
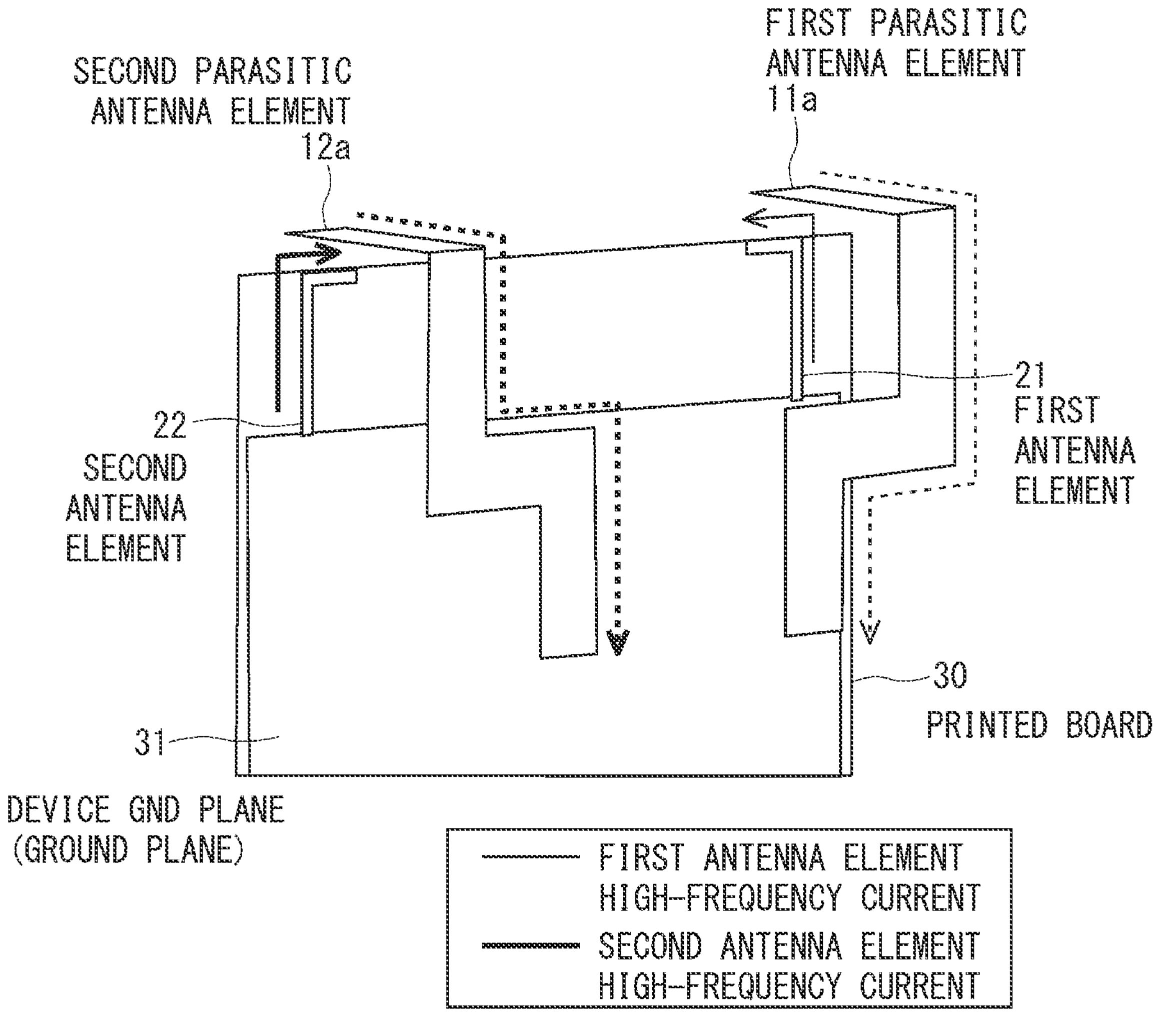
FIG. 9 schematically illustrates an example of an antenna operation in the antenna configuration shown in FIG. 8.

FIG. 9 is a schematic diagram for illustrating an example of the antenna operation in the antenna configuration shown in FIG. 8, and shows situations of the first parasitic antenna element 11*a* and the second parasitic antenna element 12*a* in a case where high-frequency currents flow from the feeding points to the omnidirectional inverted-L antenna elements, which are the first antenna element 21 and the second antenna element 22.

When high-frequency currents of a frequency of 2.6 GHz respectively flow into the first antenna element 21 and the second antenna element 22 as indicated by solid arrows in FIG. 9, excited high-frequency currents of a frequency of 2.6 GHz flow in the opposite direction into the first parasitic antenna element 11*a* and the second parasitic antenna element 12*a* arranged in parallel respectively adjacent to the first antenna element 21 and the second antenna element 22 as indicated by broken arrows in FIG. 9. Here, the antenna shapes of the first parasitic antenna element 11*a* and the second parasitic antenna element 12*a* have antenna element components bent at a right angle in the −X-axis direction and the X-axis direction, respectively. Accordingly, as indicated by broken arrows in FIG. 9, high-frequency currents flow not only in the Z-axis direction but also the horizontal directions, which are the X-axis direction and the −X-axis direction, into the first parasitic antenna element 11*a* and the second parasitic antenna element 12*a*.

Figure 10:
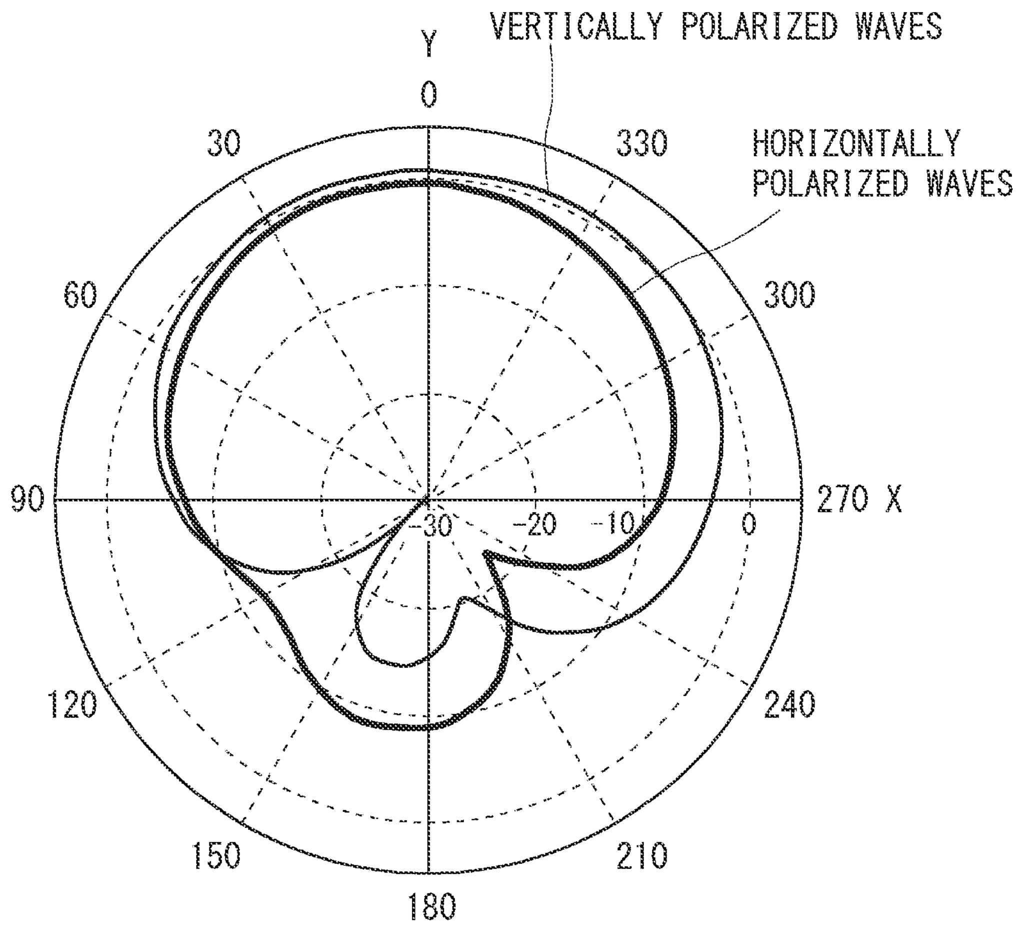
FIG. 10 is a characteristic diagram showing a measurement result of an emission pattern of vertically polarized waves and horizontally polarized waves on the XY plane in a case of power feeding to the first antenna element 21 in the antenna configuration shown in FIG. 8.

As a result, not only the vertically polarized wave component but also the horizontally polarized wave component occurs as an emission pattern on the XY plane, and an emission pattern having the directivity in the Y-axis direction in each of the vertically polarized wave component and the horizontally polarized wave component is obtained. FIG. 10 is a characteristic diagram showing a measurement result of an emission pattern of vertically polarized waves and horizontally polarized waves on the XY plane in the case of power feeding to a first antenna element 21 in the antenna configuration shown in FIG. 8. In the characteristic diagram in FIG. 10, similar to the characteristic diagram in FIG. 7, a curve indicated by a thin line shows the emission pattern of vertically polarized waves on the XY plane, and a curve indicated by a thick line shows the emission pattern of horizontally polarized waves on the XY plane. The characteristic diagram showing the measurement result of the emission patterns of vertically polarized waves and horizontally polarized waves on the XY plane in the case of power feeding to the second antenna element 22 in the antenna configuration shown in FIG. 8, is substantially identical or similar to the characteristic diagram in FIG. 10. Accordingly, illustration thereof is omitted.

Unlike the characteristic diagram in FIG. 7 according to the antenna configuration in FIGS. 3A and 3B, as shown in the characteristic diagram in FIG. 10, both the emission pattern of horizontally polarized waves and the emission pattern of vertically polarized waves on the XY plane can confirm that characteristics having a directivity in the Y-axis direction are achieved.

As described above, in the antenna configuration in FIG. 8, the antenna shapes of antenna element parts arranged along the back surface of the printed board 30 corresponding to the two parasitic antenna elements, which are the first parasitic antenna element 11*a* and the second parasitic antenna element 12*a*, are bent shapes as exemplified in FIG. 8. In other words, as for the parasitic antenna elements arranged adjacent to the device GND plane 31 (ground plane), the shape of each antenna element part up to the edge (upper edge) of the printed board 30 is a bent shape including an antenna element part bent at a right angle in a direction parallel to the edge. New advantageous effects can be exerted additionally to those by the antenna configuration in FIGS. 3A and 3B in the aforementioned example embodiment indicating that the antenna having the directivity in the Y-axis direction not only in vertically polarized waves but also in the horizontally polarized waves can be configured.

Other Second Example Embodiment of Present Invention

Next, as a second example embodiment of the present invention, an example embodiment further different from the aforementioned example embodiment and other first example embodiment are described.

In a case of using the home router having the WiMAX function as the wireless communication device, a wireless LAN (Local Area Network) is often used to communicate with the subordinate wireless communication terminal as described above. Typically, to improve the communication performance of the WiMAX function of the home router, the home router is installed near a window in a favorable radio wave environment. A configuration is made such that the directivity of the antenna for the WiMAX function is adjusted toward the outside of the window. Even in such a case, it is a matter of course that the antenna for the wireless LAN function used to communicate with the subordinate wireless communication terminal is preferably configured to have the directivity of the antenna for the wireless LAN function adjusted to the inside of a window where the subordinate wireless communication terminal resides.

That is, preferably, the antenna configuration for the WiMAX function is the configuration exemplified in FIGS. 3A and 3B or FIG. 8 and is the configuration having the directivity in the Y-axis direction, while inversely, the antenna configuration for the wireless LAN function has the configuration with the directivity in the −Y-axis direction. An example of such an antenna configuration is hereinafter described with reference to the schematic diagrams in FIGS. 11A and 11B.

Figure 11A:
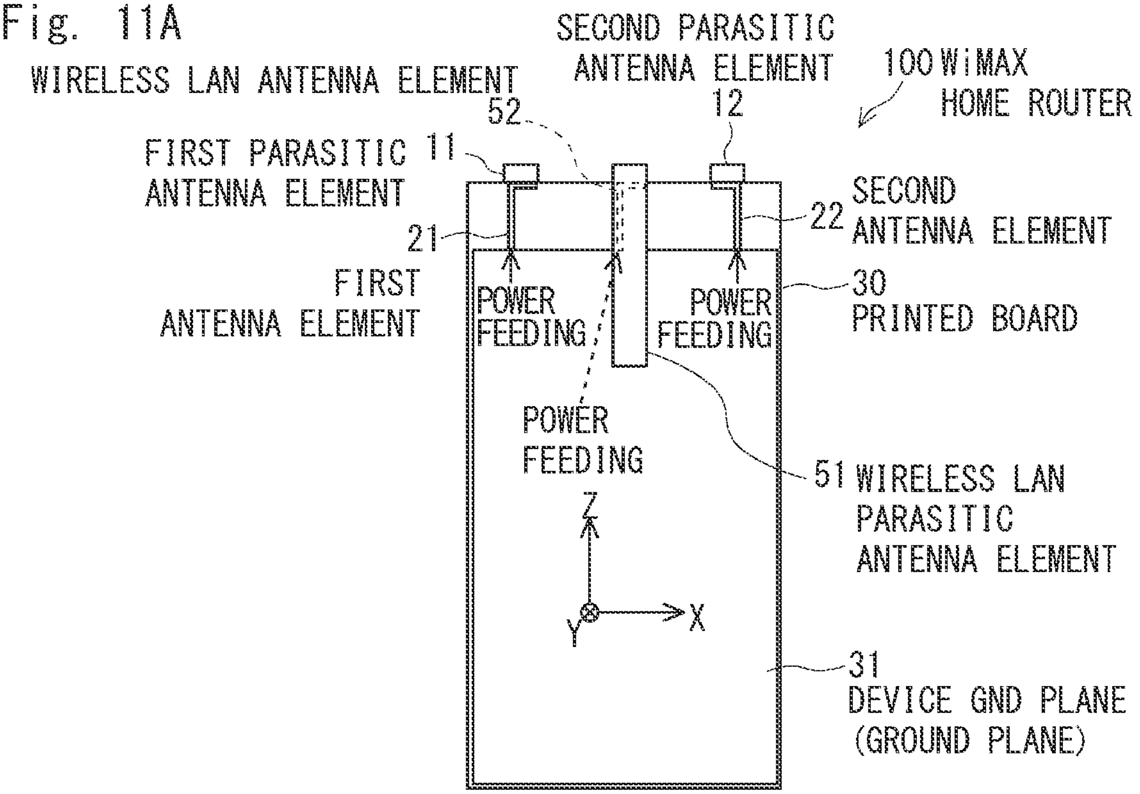
FIG. 11A schematically shows an example of an antenna configuration that is different from that in FIGS. 3A, 3B and 8 and is of the WiMAX home router, which is an example of the wireless communication device according to the present invention.
Figure 11B:
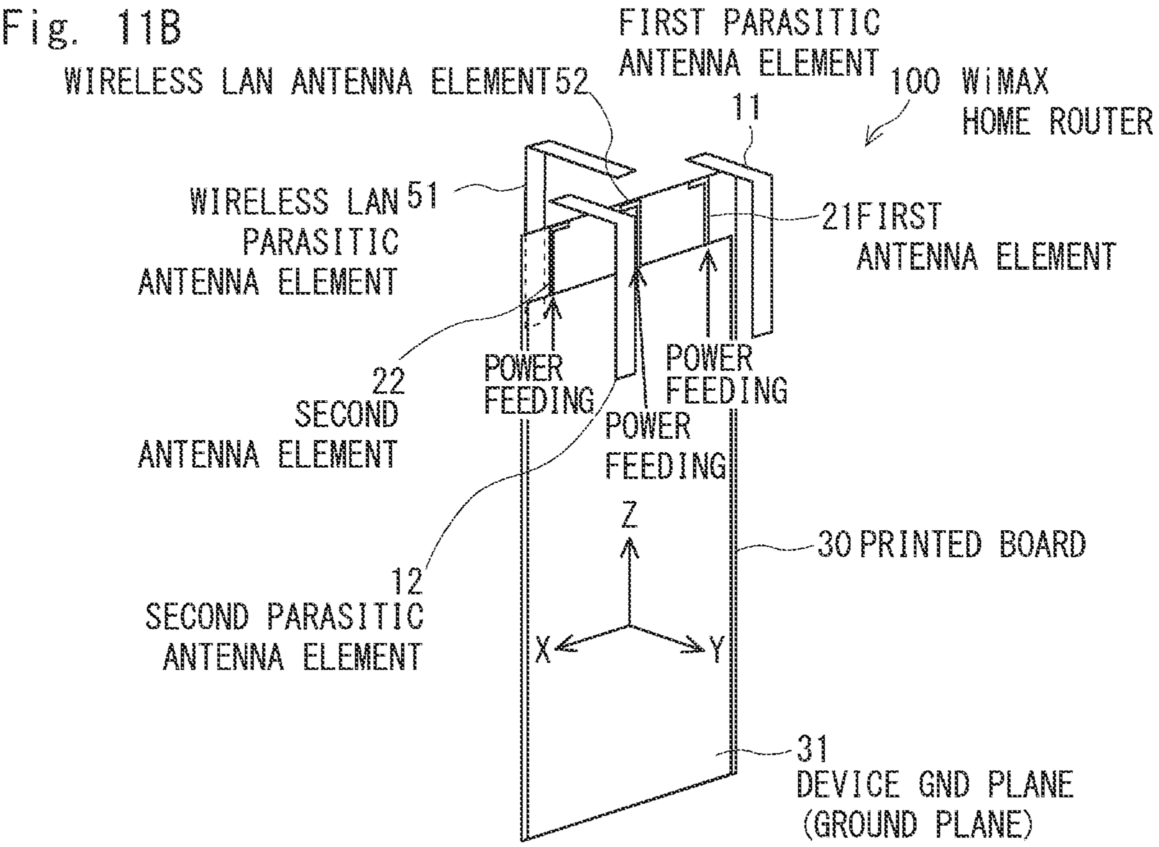
FIG. 11B schematically shows an example of the antenna configuration that is different from that in FIGS. 3A, 3B and 8 and is of the WiMAX home router, which is the example of the wireless communication device according to the present invention.

FIGS. 11A and 11B schematically show an example of an antenna configuration of the WiMAX home router 100, which is an example of the wireless communication device according to the present invention, different from that in FIGS. 3A, 3B and 8, and show a case of an example where the first parasitic antenna element 11 and the second parasitic antenna element 12 in FIGS. 3A and 3B are arranged as the parasitic antenna elements, and an antenna element for the wireless LAN function is further added. Here, similar to FIG. 3A, FIG. 11A schematically shows a front view of the printed board 30 in the WiMAX home router 100. Similar to FIG. 3B, FIG. 11B schematically shows a perspective rear view of the printed board 30 in the WiMAX home router 100.

Similar to the case in FIGS. 3A and 3B, as shown in FIGS. 11A and 11B, the first antenna element 21 and the second antenna element 22 are respectively arranged to extend in the Z-axis direction from the feeding points separately at a position on the right end and a position on the left end of the printed board 30. Similar to FIGS. 3A and 3B, the first parasitic antenna element 11 and the second parasitic antenna element 12 are arranged on the back surface of the printed board 30, and are respectively arranged at positions adjacent to the first antenna element 21 and the second antenna element 22 in a state of being parallel to the first antenna element 21 and the second antenna element 22 (that is, in a state of extending in the Z-axis direction). Subsequently, the shape is bent at a right angle in the −Y-axis direction (toward the surface of the printed board 30) at a position at the edge (upper edge) of the printed board 30.

On the other hand, as shown in FIGS. 11A and 11B, between a wireless LAN antenna element 52 and a wireless LAN parasitic antenna element 51 added as antenna elements for the wireless LAN function, the wireless LAN antenna element 52 is formed on the printed board 30, and is arranged so as to extend in the Z-axis direction at a substantially center position of the printed board 30 in the X-axis direction (horizontal direction), for example. Note that the wireless LAN antenna element 52 supplied with power from the feeding point for the wireless LAN function is an omnidirectional antenna element. For example, as shown in FIG. 11B, a case of using an inverted-L antenna element is shown.

As shown in FIGS. 11A and 11B, in order to provide the antenna characteristics for the directivity in the direction opposite to that of parasitic antenna elements for WiMAX (i.e., the first parasitic antenna element 11 and the second parasitic antenna element 12), the wireless LAN parasitic antenna element 51 is arranged at a position close to the surface of the printed board 30 that is a surface opposite to that of the parasitic antenna element for WiMAX, and is arranged at a position close to the wireless LAN antenna element 52 in a state of being parallel to the wireless LAN antenna element 52 (that is, in the state of extending in the Z-axis direction).

That is, as shown in FIGS. 11A and 11B, in a case where the parasitic antenna elements for WiMAX (i.e., the first parasitic antenna element 11 and the second parasitic antenna element 12) are closely arranged on the back surface of the printed board 30, the wireless LAN parasitic antenna element 51 is closely arranged on the surface of the printed board 30 opposite to that of the parasitic antenna element for WiMAX. The wireless LAN parasitic antenna element 51 has a shape of extending in the Z-axis direction, and of being bent at a right angle in the Y-axis direction (i.e., toward the back surface of the printed board 30) in the direction opposite to that of the parasitic antenna element for WiMAX so as to be close to the printed board 30 at a position where the wireless LAN parasitic antenna element 51 reaches the edge (upper edge) of the printed board 30.

Figure 12:
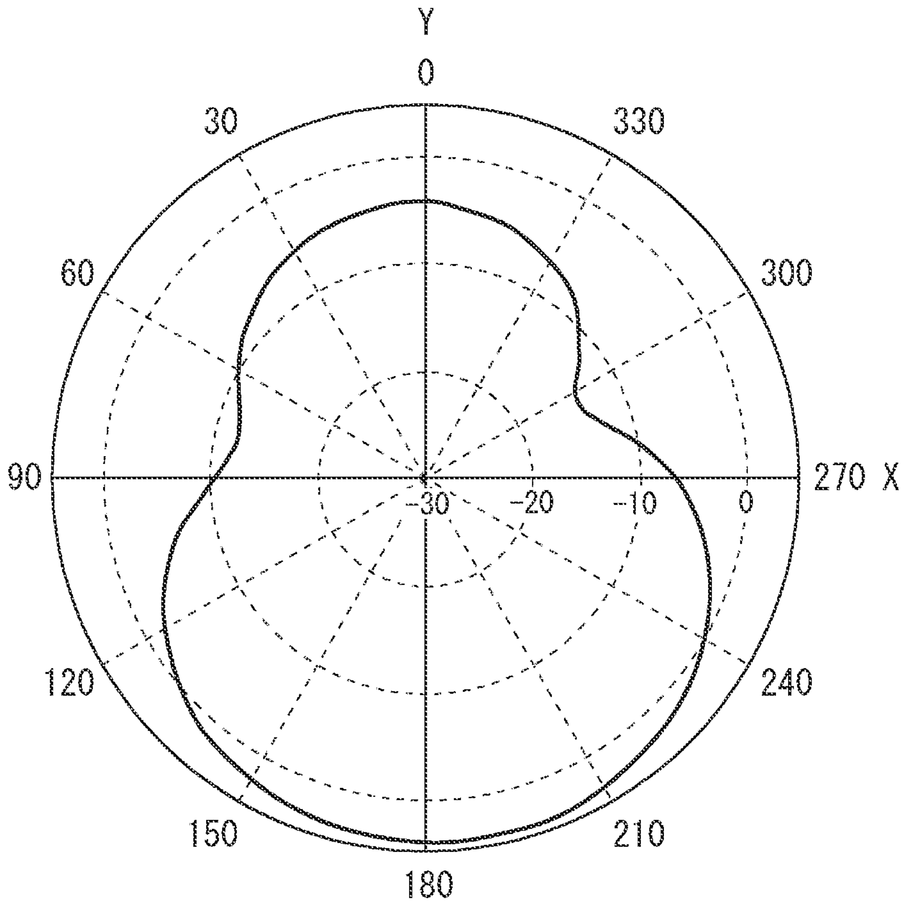
FIG. 12 is a characteristic diagram showing a measurement result of an emission pattern of vertically polarized waves on the XY plane of a wireless LAN parasitic antenna element having the antenna configuration shown in FIGS. 11A and 11B.

The antenna configuration as in FIGS. 11A and 11B allows the parasitic antenna element for the WiMAX function (i.e., the first parasitic antenna element 11 and the second parasitic antenna element 12) to emit radio waves having the directivity in the Y-axis direction, as described above. On the other hand, the wireless LAN parasitic antenna element 51 emits radio waves having the directivity in the −Y-axis direction that is a direction opposite to that of the parasitic antenna element for the WiMAX function. FIG. 12 is a characteristic diagram showing a measurement result of an emission pattern of vertically polarized waves on the XY plane of a wireless LAN parasitic antenna element 51 having the antenna configuration shown in FIGS. 11A and 11B.

As shown in a characteristic diagram in FIG. 12, it can be confirmed that the wireless LAN parasitic antenna element 51 shown in FIGS. 11A and 11B is configured to include the antenna having the strong directivity in the −Y-axis direction as the emission pattern of vertically polarized waves on the XY plane.

Note that FIGS. 11A, 11B and 12 have illustrated, in the WiMAX home router 100, the case of transmitting and receiving radio waves for wireless LAN communication in a direction opposite to that of radio waves for WiMAX communication. However, the case is not limited only to the radio waves for wireless LAN communication. Alternatively, radio waves for any type of wireless communication can be transmitted and received in a direction different from or a direction identical to that of the radio waves for WiMAX.

For example, the following antenna configuration may be adopted when other-standard radio waves conforming to a standard different from a standard of radio waves transmitted and received by the omnidirectional antenna elements, which are the first antenna element 21 and the second antenna element 22, are intended to form an emission pattern having the directivity in the opposite direction or the identical direction of the emission pattern of the radio waves transmitted and received by the omnidirectional antenna elements. First, an other-standard omnidirectional antenna element (e.g., the wireless LAN antenna element 52) connected to a feeding point for the other-standard radio waves is arranged on the printed board 30. An other-standard parasitic antenna element (e.g., the wireless LAN parasitic antenna element 51) is arranged at a position adjacent to the other-standard omnidirectional antenna element, in a state of being parallel to the other-standard omnidirectional antenna element, and the other-standard parasitic antenna element is arranged in a state of being close to the device GND plane (ground plane) 31 on the opposite side or the identical side of the omnidirectional antenna element. Furthermore, the entire length of the other-standard parasitic antenna element is set to be a length that is (½) of the wavelength of radio signals handled by the other-standard omnidirectional antenna element.

As described above, in conformity with the opposite party of communication through radio waves, the parasitic antenna element having a directivity different from that of the parasitic antenna element for the WiMAX function can be easily implemented. Unlike the WiMAX home router 100, for example, radio waves in the LTE standard may be handled. Alternatively, similar to a case of handling radio waves for vehicle-mounted use, any wireless communication device may be applied. New advantageous effects can also be exerted that in conformity with the opposite party of communication through radio waves, the parasitic antenna elements separately having directivities different from each other can be easily implemented.

Figure 13A:
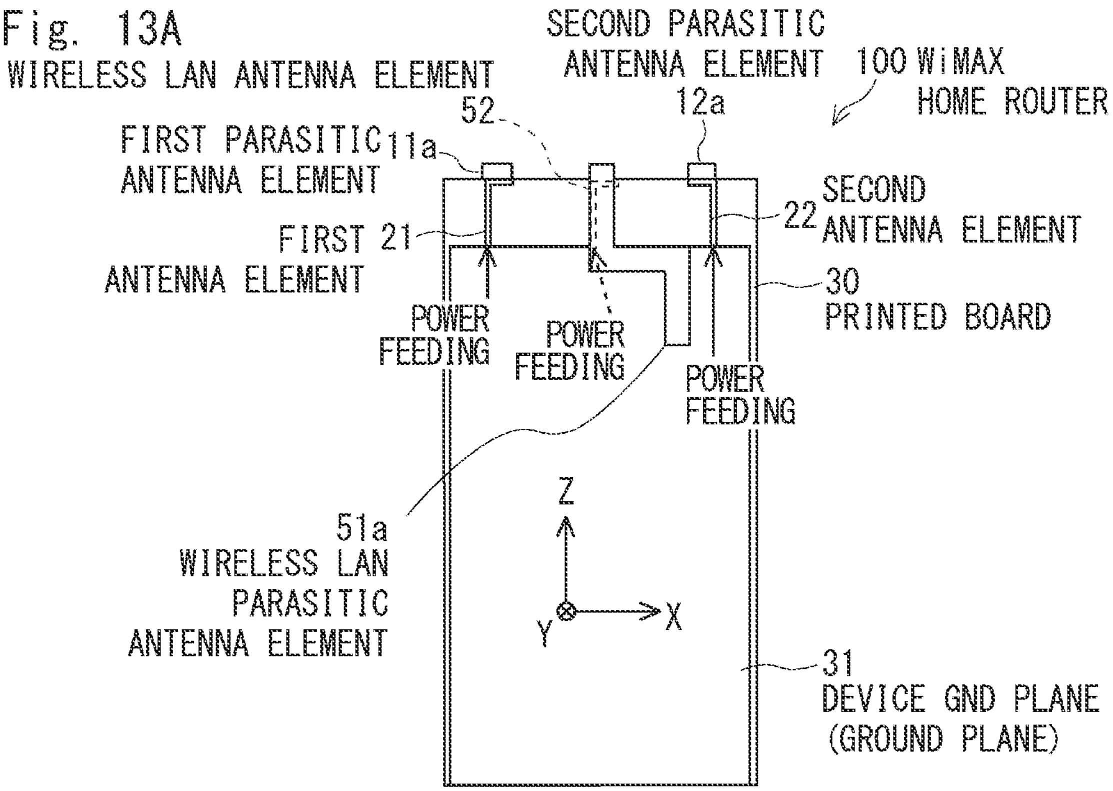
FIG. 13A schematically shows an example of an antenna configuration that is further different from that in FIGS. 3A, 3B, 8, 11A and 11B and is of the WiMAX home router, which is an example of the wireless communication device according to the present invention.
Figure 13B:
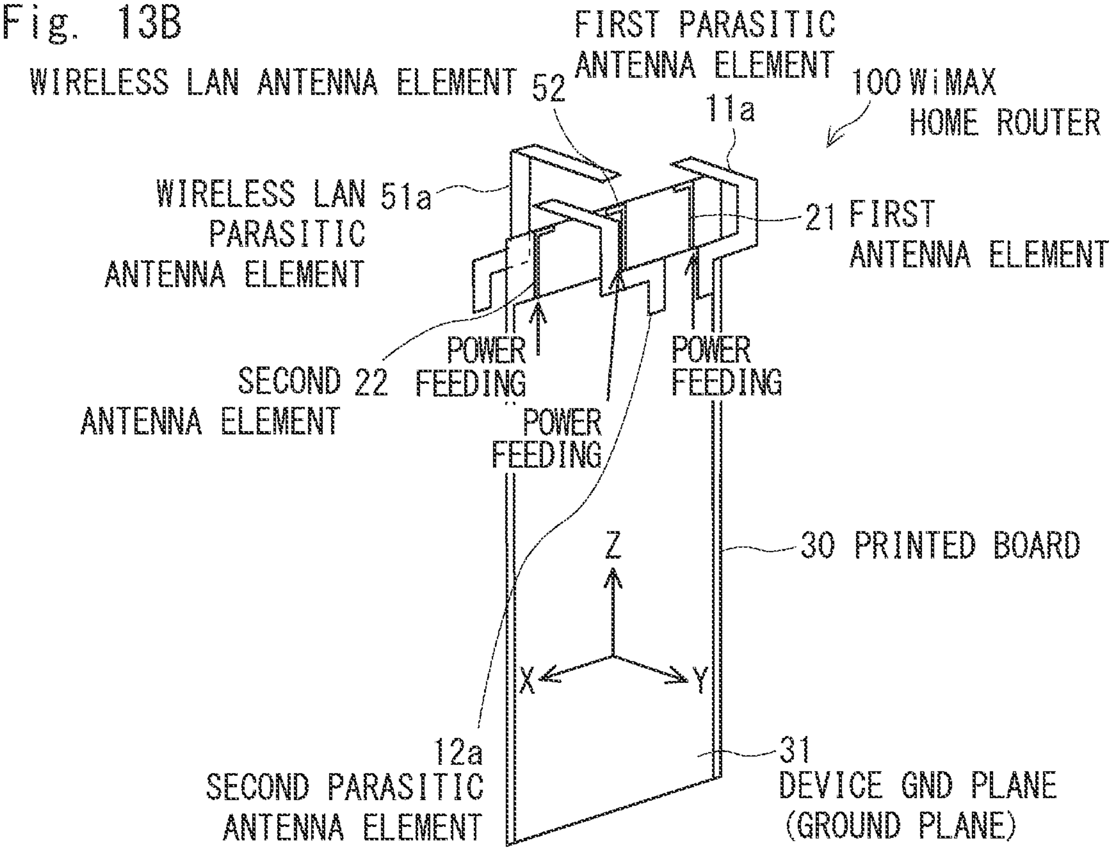
FIG. 13B schematically shows the example of the antenna configuration that is further different from that in FIGS. 3A, 3B, 8, 11A and 11B and is of the WiMAX home router, which is the example of the wireless communication device according to the present invention.

Similar to the case of the parasitic antenna element for the WiMAX function having the bent shape shown in FIG. 8, as another first example embodiment, a bent shape of being bent also in the X-axis direction (horizontal direction) in the middle before reaching the edge (upper edge) of the printed board 30 may be adopted also for the wireless LAN parasitic antenna element 51. By forming such a bent shape, the antenna for the wireless LAN function can be configured to have a strong directivity in the −Y-axis direction not only for vertically polarized waves on the XY plane but also for horizontally polarized waves. FIGS. 13A and 13B schematically show an example of an antenna configuration of the WiMAX home router 100, which is an example of the wireless communication device according to the present invention, different from that in FIGS. 3A, 3B, 8, 11A and 11B, and show a case where a wireless LAN parasitic antenna element 51*a* is configured to have a bent shape by bending the shape of the wireless LAN parasitic antenna element 51 shown in FIGS. 11A and 11B also in the X-axis direction. Here, similar to FIG. 11A, FIG. 13A schematically shows a front view of the printed board 30 in the WiMAX home router 100. Similar to FIG. 11B, FIG. 13B schematically shows a perspective rear view of the printed board 30 in the WiMAX home router 100.

Unlike FIGS. 11A and 11B, FIG. 13B shows a case where about the parasitic antenna element for WiMAX, the antenna elements other than the wireless LAN parasitic antenna element 51*a* are configured using antenna elements (i.e., the first parasitic antenna element 11*a* and the second parasitic antenna element 12*a*) having a bent shape similar to that in the case shown in FIG. 8. However, the first antenna element 21, the second antenna element 22, and the wireless LAN antenna element 52 have antenna shapes similar to those in the case in FIGS. 11A and 11B.

Next, the antenna shape of the wireless LAN parasitic antenna element 51*a* is further described. Similar to the case in FIGS. 11A and 11B, the wireless LAN parasitic antenna element 51*a* is arranged at a substantially center position on the printed board 30 in the X-axis direction (horizontal direction) and extends in the Z-axis direction, and is bent at a right angle in the middle before reaching the edge (upper edge) of the printed board 30 so as to extend along the surface of the printed board 30 in the −X-axis direction (horizontal direction), for example. Subsequently, the wireless LAN parasitic antenna element 51*a* is bent again at a right angle so as to extend in the Z-axis direction, and is then bent at a right angle in the Y-axis direction (i.e., toward the back surface of the printed board 30) so as to be close to the printed board 30 at a position where the wireless LAN parasitic antenna element 51*a* reaches the edge (upper edge) of the printed board 30.

Note that in the case where the center position of the wireless LAN parasitic antenna element 51*a* in the length direction having a length of (½) of the entire length is at the antenna element part in the Z-axis direction before bending at a right angle in the −X-axis direction, the antenna element part in the Z-axis direction before bending at a right angle in the −X-axis direction is arranged at a substantially center position of the printed board 30 in the X-axis direction (horizontal direction), as described above. However, in a case where the center position of the wireless LAN parasitic antenna element 51*a* in the length direction having a length of (½) of the entire length is at any of different antenna element parts, it is preferable that the center position of the wireless LAN parasitic antenna element 51*a* in the length direction having a length of (½) of the entire length be arranged to be a substantially center position of the printed board 30 in the X-axis direction (horizontal direction).

Use of the wireless LAN parasitic antenna element 51*a* having such a bent shape causes not only the vertically polarized wave component but also the horizontally polarized wave component as emission patterns of the wireless LAN parasitic antenna element 51*a* on the XY plane, and can thus achieve emission patterns having the directivity in the −Y-axis direction in both the vertically polarized wave component and the horizontally polarized wave component.

Figure 14:
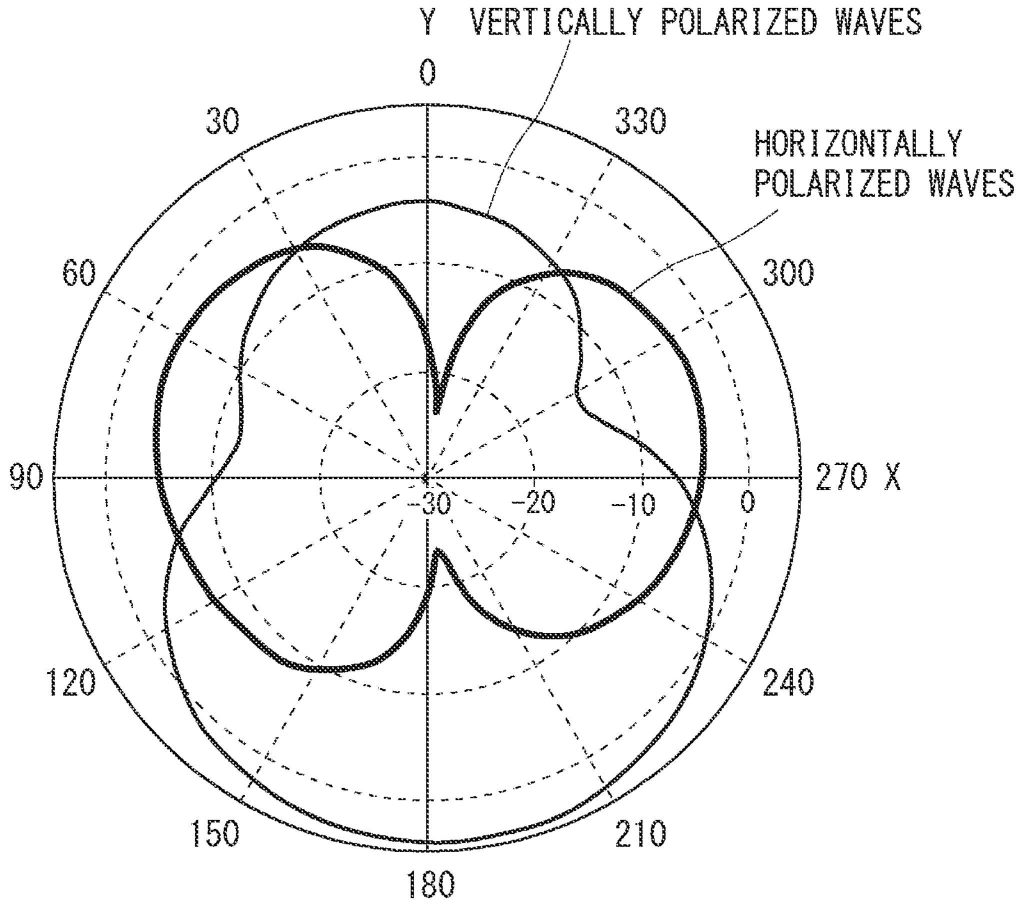
FIG. 14 is a characteristic diagram showing a measurement result of an emission pattern of vertically polarized waves and horizontally polarized waves on the XY plane of a wireless LAN parasitic antenna element having the antenna configuration shown in FIGS. 11A and 11B.

FIG. 14 is characteristic diagram showing a measurement result of the emission patterns of vertically polarized waves and horizontally polarized waves on the XY plane of the wireless LAN parasitic antenna element 51 having the antenna configuration shown in FIGS. 11A and 11B, and shows a comparison target for illustrating the advantageous effects of the wireless LAN parasitic antenna element 51*a* having the bent shape in FIGS. 13A and 13B. Note that in the characteristic diagram in FIG. 14, a curve indicated by a thin line shows the emission pattern of vertically polarized waves on the XY plane, and a curve indicated by a thick line shows the emission pattern of horizontally polarized waves on the XY plane. As shown in the characteristic diagram in FIG. 14, the emission pattern of vertically polarized waves on the XY plane is completely identical to what is shown in the characteristic diagram in FIG. 12 (the pattern having the directivity in the −Y-axis direction). However, it is shown that unlike the emission pattern of vertically polarized waves, the emission pattern of horizontally polarized waves on the XY plane is in a state of having no directivity in the −Y-axis direction.

Figure 15:
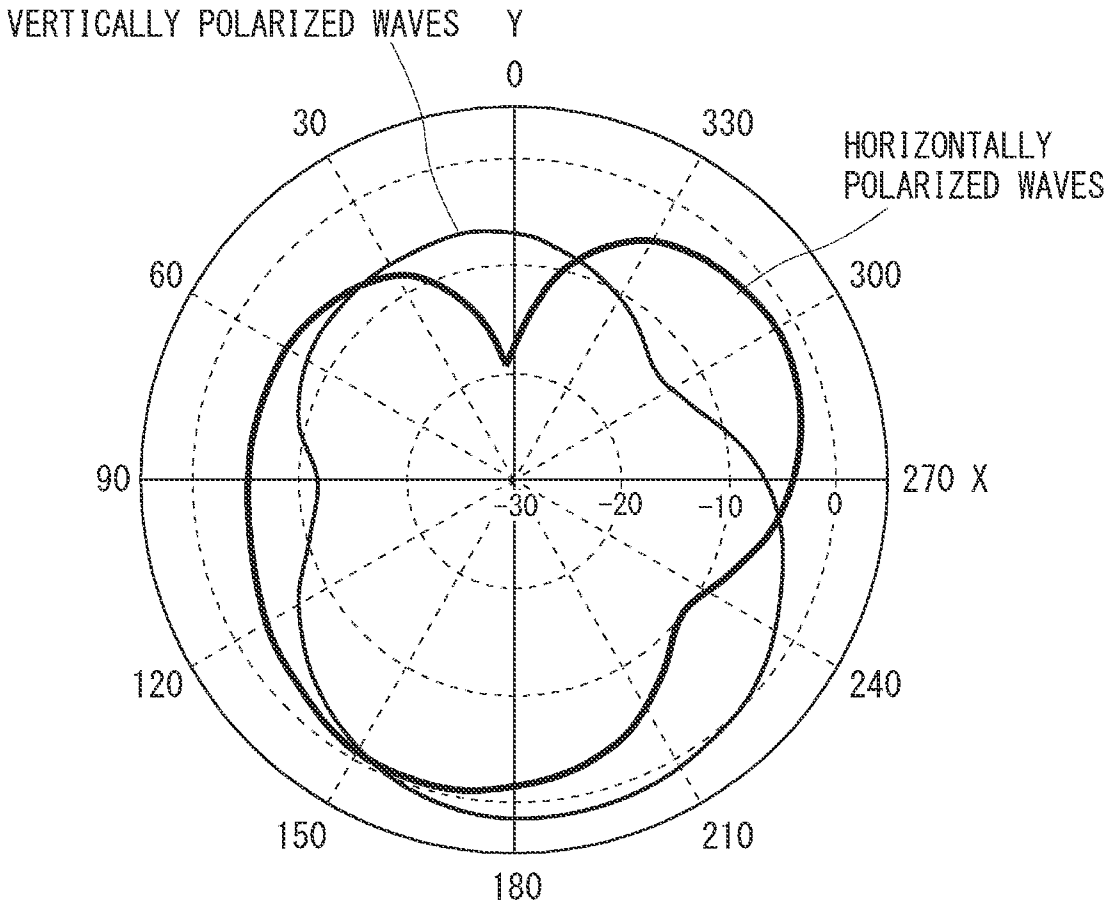
FIG. 15 is a characteristic diagram showing a measurement result of an emission pattern of vertically polarized waves and horizontally polarized waves on the XY plane of a wireless LAN parasitic antenna element having the antenna configuration shown in FIGS. 13A and 13B.

On the other hand, FIG. 15 is a characteristic diagram showing a measurement result of the emission patterns of vertically polarized waves and horizontally polarized waves on the XY plane of the wireless LAN parasitic antenna element 51*a* having the antenna configuration shown in FIGS. 13A and 13B, and shows that the advantageous effects of the wireless LAN parasitic antenna element 51*a* having the bent shape in FIGS. 13A and 13B are clearly demonstrated. In the characteristic diagram in FIG. 15, similar to the case in FIG. 14, a curve indicated by a thin line shows the emission pattern of vertically polarized waves on the XY plane, and a curve indicated by a thick line shows the emission pattern of horizontally polarized waves on the XY plane.

Unlike the characteristic diagram in FIG. 14 about the antenna configuration in FIGS. 11A and 11B, as shown in the characteristic diagram in FIG. 15, both the emission pattern of horizontally polarized waves on the XY plane and the emission pattern of vertically polarized waves can confirm that characteristics having the directivity in the −Y-axis direction is achieved.

In the antenna configuration in FIG. 13, the parasitic antenna element for wireless LAN has the bent shape obtained by bending the antenna shape of the wireless LAN parasitic antenna element 51*a* arranged close to the surface of the printed board 30, also in the horizontal direction (e.g., the −X-axis direction). Accordingly, new advantageous effects can be exerted that can configure the antenna having the directivity in the −Y-axis direction not only about vertically polarized waves but also about horizontally polarized waves and are further added to the antenna configuration in FIG. 11 in the aforementioned example embodiment.

The configurations of the preferable example embodiments of the present invention have thus been described above. However, it should be noted that these example embodiments are only examples of the present invention, and do not limit the present invention at all. Those skilled in the art can easily understand that various changes and modifications can be made according to specific usages without departing from the gist of the present invention.

The present application claims the priority based on Japanese Patent Application No. 2019-017076 filed Feb. 1, 2019, the disclosure of which is herein incorporated by reference in its entirety.

INDUSTRIAL APPLICABILITY

The present invention can be used for devices that utilize wireless communication.

REFERENCE SIGNS LIST

11 First parasitic antenna element
11*a* First parasitic antenna element
12 Second parasitic antenna element
12*a* Second parasitic antenna element
21 First antenna element
22 Second antenna element
30 Printed board
31 Device GND plane (ground plane)
40A Housing
40B Housing
51 Wireless LAN parasitic antenna element
51*a* Wireless LAN parasitic antenna element
52 Wireless LAN antenna element
100 WiMAX home router

What is claimed is:

1. A wireless communication device having an antenna configuration in which an omnidirectional antenna element connected to a feeding point is arranged on a printed board, wherein a ground plane connected to a ground potential is formed on the printed board so as to cover an area other than a part where an electronic circuit is formed on the printed board, a parasitic antenna element is arranged at a position adjacent to the omnidirectional antenna element, in a state of being parallel to the omnidirectional antenna element, and the parasitic antenna element is arranged at a position where the parasitic antenna element can receive radio waves reflected on the ground plane, an entire length of the parasitic antenna element is set to be a length that is (½) of a wavelength of radio waves handled by the omnidirectional antenna element, the parasitic antenna element, at a position by the ground plane and where the parasitic antenna element reaches an edge of the printed board, is bent at a right angle in a direction of approaching the printed board, and a center position of the parasitic antenna element in a length direction is set at a position where the parasitic antenna element can receive the radio waves reflected on the ground plane.

2. The wireless communication device, according to claim 1, wherein the parasitic antenna element, at the position by the ground plane and up to the edge of the printed board, is bent at the right angle in a direction parallel to the edge.

3. The wireless communication device, according to claim 1, wherein the omnidirectional antenna element includes an inverted-L antenna element or an inverted-F antenna element.

4. The wireless communication device, according to claim 1, wherein the omnidirectional antenna element is configured to transmit and receive radio waves conforming to a WiMAX (Worldwide Interoperability for Microwave Access) standard or an LTE (Long Term Evolution) standard.

5. A wireless communication device having an antenna configuration in which an omnidirectional antenna element connected to a feeding point is arranged on a printed board, wherein a ground plane connected to a ground potential is formed on the printed board so as to cover an area other than a part where an electronic circuit is formed on the printed board, a parasitic antenna element is arranged at a position adjacent to the omnidirectional antenna element, in a state of being parallel to the omnidirectional antenna element, and the parasitic antenna element is arranged at a position where the parasitic antenna element can receive radio waves reflected on the ground plane, an entire length of the parasitic antenna element is set to be a length that is (½) of a wavelength of radio waves handled by the omnidirectional antenna element, when other-standard radio waves conforming to a standard different from a standard of the radio waves transmitted and received by the omnidirectional antenna element form an emission pattern having a directivity in an opposite direction or an identical direction of an emission pattern of the radio waves transmitted and received by the omnidirectional antenna element, an other-standard omnidirectional antenna element connected to a feeding point for the other-standard radio waves is arranged on the printed board, an other-standard parasitic antenna element is arranged at a position adjacent to the other-standard omnidirectional antenna element, in a state of being parallel to the other-standard omnidirectional antenna element, and the other-standard parasitic antenna element is arranged in a state of being by the ground plane on an opposite side or an identical side of the parasitic antenna element, and an entire length of the other-standard parasitic antenna element is set to be a length that is (½) of a wavelength of radio waves handled by the other-standard omnidirectional antenna element, the parasitic antenna element, at a position by the ground plane and where the parasitic antenna element reaches an edge of the printed board, is bent at a right angle in a direction of approaching the printed board, and a center position of the parasitic antenna element in a length direction is set at a position where the parasitic antenna element can receive the radio waves reflected on the ground plane.

6. An antenna configuration method for a wireless communication device having an antenna configuration in which an omnidirectional antenna element connected to a feeding point is arranged on a printed board, wherein a ground plane connected to a ground potential is formed on the printed board so as to cover an area other than a part where an electronic circuit is formed on the printed board, a parasitic antenna element is arranged at a position adjacent to the omnidirectional antenna element, in a state of being parallel to the omnidirectional antenna element, and the parasitic antenna element is arranged at a position where the parasitic antenna element can receive radio waves reflected on the ground plane an entire length of the parasitic antenna element is set to be a length that is (½) of a wavelength of radio waves handled by the omnidirectional antenna element, the parasitic antenna element, at a position by the ground plane and where the parasitic antenna element reaches an edge of the printed board, is bent at a right angle in a direction of approaching the printed board, and a center position of the parasitic antenna element in a length direction is set at a position where the parasitic antenna element can receive the radio waves reflected on the ground plane.

7. The antenna configuration method, according to claim 6, wherein the parasitic antenna element, at the position by the ground plane and up to the edge of the printed board, is bent at the right angle in a direction parallel to the edge.

8. The antenna configuration method, according to claim 6, wherein the omnidirectional antenna element includes an inverted-L antenna element or an inverted-F antenna element.

* * * * *